United States Patent [19]

Aibe et al.

[11] Patent Number: 5,288,306
[45] Date of Patent: Feb. 22, 1994

[54] ACTIVATED CARBON HONEYCOMBS AND APPLICATIONS THEREOF

[75] Inventors: Toshio Aibe, Tsukuba; Kazuo Shibata, Tohnosho, both of Japan

[73] Assignee: Takeda Chemical Industries, Ltd., Osaka, Japan

[21] Appl. No.: 917,197

[22] Filed: Jul. 22, 1992

[30] Foreign Application Priority Data

| Jul. 22, 1991 | [JP] | Japan | 2-06282 |
| Sep. 18, 1991 | [JP] | Japan | 2-68315 |
| Feb. 28, 1992 | [JP] | Japan | 78910 |
| Apr. 22, 1992 | [JP] | Japan | 1-29997 |

[51] Int. Cl.$^5$ .............................. B01D 53/04
[52] U.S. Cl. ..................... 95/141; 96/109; 96/135; 96/147; 96/153; 96/132
[58] Field of Search ............... 55/71, 74, 387, 70, 55/77–79, 388, 390, 524, 124, DIG. 39

[56] References Cited

U.S. PATENT DOCUMENTS

| 1,774,156 | 8/1930 | Root | 55/387 X |
| 3,950,155 | 4/1976 | Komiyama | 55/387 X |
| 3,956,458 | 5/1976 | Anderson | 55/73 X |
| 4,016,242 | 4/1977 | Deitz et al. | 55/74 X |
| 4,072,479 | 2/1978 | Sinha et al. | 55/74 X |
| 4,072,480 | 2/1978 | Wagner | 55/73 |
| 4,111,833 | 9/1978 | Evans | 55/387 X |
| 4,242,226 | 12/1980 | Siren | 55/74 X |
| 4,259,092 | 3/1981 | Matsuo et al. | 55/78 |
| 4,377,396 | 3/1983 | Krauss et al. | 55/74 X |
| 4,377,400 | 3/1983 | Okamoto et al. | 55/387 X |
| 4,386,947 | 6/1983 | Mizuno et al. | 55/387 |
| 4,397,663 | 8/1983 | Michlin et al. | 55/387 |
| 4,473,282 | 9/1984 | Michlin | 55/387 X |
| 4,484,938 | 11/1984 | Okamoto et al. | 55/387 X |
| 4,500,327 | 2/1985 | Nishino et al. | 55/74 X |
| 4,518,704 | 5/1985 | Okabayashi et al. | 55/74 X |
| 4,559,066 | 12/1985 | Hunter et al. | 55/387 X |
| 4,737,173 | 4/1988 | Kudirka et al. | 55/316 X |
| 5,059,224 | 10/1991 | Kikkawa et al. | 55/387 X |
| 5,064,451 | 11/1991 | Phillips | 55/387 X |

FOREIGN PATENT DOCUMENTS

| 0331192 | 9/1989 | European Pat. Off. . |
| 0487263 | 5/1992 | European Pat. Off. . |
| 1388453 | 12/1964 | France . |
| 2532188 | 3/1984 | France . |
| 59-227704 | 12/1984 | Japan | 55/387 |
| 62-9377 | 2/1987 | Japan . |
| 62-262742 | 11/1987 | Japan . |
| 1-2915 | 1/1989 | Japan . |
| 1225751 | 3/1971 | United Kingdom | 55/316 |
| 2088719 | 6/1982 | United Kingdom . |

OTHER PUBLICATIONS

Database WPIL Corresponding to Japanese Patent Laid–Open No. 57-30531.
Database WPIL Corresponding to Japanese Patent Laid Open No. 1-184346.
Derwent Japanese Patent Report Corresponding to JP-A-2 120 432.
European Search Report.

*Primary Examiner*—Robert Spitzer
*Attorney, Agent, or Firm*—Wegner, Cantor, Mueller & Player

[57] ABSTRACT

A gas containing malodorous/harmful components is treated with an iodine- and/or inorganic iodide-supporting activated carbon honeycomb 6 disposed in a gas passageway 5 extending from a gas inlet 3 to a gas outlet 4. The gas may be treated with this iodine-and/or inorganic iodide-supporting activated honeycomb 6 and an acid-supporting activated carbon honeycomb 7. A fan 8 may be provided in a downstream position within the gas passageway. The operation of the fan may be associated with a sensor for detecting malodorous/harmful components and/or a timer which controls the operating duration of a motor. The above activated carbon honeycomb will eliminate various malodorous/harmful substances, such as ammonia and sulfur-containing compounds, with high efficiency and low flow resistance. The activated carbon honeycomb can be used for the treatment of a variety of gases and is particularly useful for the deodorization of toilets.

32 Claims, 24 Drawing Sheets

ACTIVATED CARBON HONEYCOMBS AND APPLICATIONS THEREOF

FIELD OF THE INVENTION

The present invention relates to a novel activated carbon honeycomb useful for removal of malodorous and harmful components from a gas and to applications thereof. More particularly, the invention relates to an activated carbon honeycomb which can be used for adsorption/elimination of the malodorous and harmful components from gases in containers, cars, hospitals, homes for the aged, conference rooms, offices, homes, hotels, eating houses, karaoke rooms, animal quarters, pet shops, refrigerators, carrier case for a plant or a pet, shoe boxes, closets, barns, dish closets, rooms in which filthy materials are handled and toilets, to a method of treating gases using said activated carbon honeycomb, and to a gas treating apparatus. The invention is particularly useful for the elimination of malodorous gases from toilets.

BACKGROUND OF THE INVENTION

For the elimination of malodorous and harmful gaseous components, methods and apparatuses are known which comprise passing a gas containing malodorous and other components through a bed of granular or fibrous activated carbon. Such malodorous or harmful gases may contain sulfur-containing compounds such as hydrogen sulfide, mercaptans, sulfides, and nitrogen-containing compounds such as ammonia, amines, and aldehydes, carboxylic acids, hydrocarbons and carbon monoxide. These malodorous and harmful gaseous components are usually present in very low concentrations in the atmosphere but with the above-mentioned activated carbon alone, it is difficult to adsorb and remove all of these malodorous and harmful components. The rate and amount of elimination are also very meager. Therefore, a large quantity of activated carbon is required for the adsorption/removal of malodorous and harmful components. Furthermore, since the activated carbon bed presents a large flow resistance, it cannot smoothly remove the malodorous and harmful components, with the result that a fan is essentially required but this results in an increased electric utility cost. Replacement of deactivated carbon with a fresh one is also complicated.

For the adsorption/elimination of malodorous components which cannot be easily removed with activated carbon, the use of a chemical-supporting activated carbon honeycomb is proposed in Japanese Patent laid open No. 262742/1987. This honeycomb, when it is supporting an acid chemical such as sulfuric acid on activated carbon, is capable of removing ammonia, while it is able to remove hydrogen sulfide and the like when an alkaline chemical is supported.

However, even with this chemical-supporting activated carbon honeycomb, the malodorous and harmful components which can be adsorbed and removed are limited by the type of chemical supported. Therefore, it is difficult to adsorb and remove a variety of malodorous and harmful components with sufficient efficiency. Moreover, when an alkaline chemical is supported for elimination of sulfur-containing compounds such as hydrogen sulfide, the ignition point of the honeycomb is depressed. It is dangerous to use such an alkali-supporting activated carbon honeycomb in an ordinary inhabited area. In addition, since the activated carbon honeycomb is carbonaceous, it becomes readily inflammable, thus causing trouble in use. On the other hand, the addition of a flame retardant leads to a decrease in the amount of adsorption per unit specific surface area and, hence, a decrease in deodorizing efficiency. In these honeycombs, it is necessary to support a large amount of chemicals on the activated carbon honeycomb in order that an enough adsorption effect is achieved.

Japanese Patent Publication No. 9377/1987 discloses a deodorizer comprising an oxide and/or oxo acid of iodine supported on activated carbon. However, since this deodorizer is granular, the flow resistance in deodorization is too large for smooth treatment of gases. It is not easy to handle it, for example, changing a deactivated one for a fresh one.

SUMMARY OF THE INVENTION

It is, therefore, an object of the invention to provide an activated carbon honeycomb for efficient elimination of sulfur-containing compounds such as hydrogen sulfide, mercaptans and sulfides.

It is another object of the invention to provide an activated carbon honeycomb with which malodorous and harmful components can be efficiently removed, even from a gas containing a large variety of malodorous and harmful components, with low flow resistance and great smoothness.

It is still another object of the invention to provide a gas treating method utilizing said activated carbon honeycomb.

It is a further object of the invention to provide a gas treating method for maintaining freshness of a plant, fruit, or the like, in a closed space.

It is a still further object of the invention to provide a gas treating apparatus with which malodorous and harmful components can be efficiently removed even from a gas containing a large variety of such components, with low flow resistance, and wherein the honeycomb can be replaced with a fresh one in a single manipulative operation.

It is a further object of the invention to provide a gas treating apparatus with which the malodorous and harmful components in a toilet can be eliminated smoothly and with high efficiency over a long period of time.

It is yet another object of the invention to provide a gas treating apparatus with which malodorous and harmful gaseous components can be efficiently eliminated even from a space where no power source is available, for example, within a refrigerator, a shoe box or a similar enclosure.

The intensive research and exploration by the inventors for accomplishing the above-mentioned objects have led them to the finding that an activated carbon honeycomb supporting iodine or/and an inorganic iodide is highly capable of adsorbing and eliminating a large variety of malodorous and harmful components. The present invention has been completed on the basis of the above finding.

Thus, the present invention provides an activated carbon honeycomb supporting one or more members selected from the group consisting of iodine and an inorganic iodide (hereinafter referred to briefly as an iodine-supporting activated carbon honeycomb unless otherwise indicated).

The inorganic iodide includes, for example, $I_2O_5$, $NH_4I$, iodides of alkali metals, iodides of alkaline earth metals, iodides of metals of the Ib group of Periodic Table of the Elements, iodides of group IIb metals of Periodic Table of the Elements, iodides of group III metals of Periodic Table of the Elements, iodides of group VI metals of Periodic Table of the Elements, iodides of group VII metals of Periodic Table of the Elements, and iodides of group VIII metals of Periodic Table of the Elements. The amount of iodine or/and inorganic iodide relative to the activated carbon honeycomb is about 0.1 to 40 weight % as iodine.

The activated carbon honeycomb on which iodine and/or an inorganic iodide is supported has a BET (Brunauer-Emmett-Teller equation) specific surface area of not less than 200 $m^2/g$, a number of cells in the range of 10 to 1,500/square inch, and a thickness of not less than 5 mm.

The invention further provides a gas treating method which comprises treating a gas containing malodorous and harmful components with an iodine-supporting activated carbon honeycomb.

The gas can be also treated using this iodine-supporting activated carbon honeycomb and at least one activated carbon honeycomb selected from the group consisting of activated carbon honeycomb, a bromine-supporting activated carbon honeycomb, a platinum group element-supporting activated carbon honeycomb and an acid-supporting activated carbon honeycomb.

The invention further provides a gas treating apparatus comprising said iodine-supporting activated carbon honeycomb as disposed in a gas passageway extending from a gas inlet to a gas outlet.

This apparatus may comprise, in addition to the iodine-supporting activated carbon honeycomb, at least one activated carbon honeycomb selected from the group consisting of an activated carbon honeycomb, a bromine-supporting activated carbon honeycomb, a platinum group element-supporting activated carbon honeycomb and an acid-supporting activated carbon honeycomb. Moreover, the apparatus may include a fan or an electro-static charge filter within said gas passageway.

The gas treating apparatus of the invention can be utilized by using a portable battery, for example, a dry battery, in the deodorization of toilets and other spaces where a power source is not easily available, for example within a refrigerator, a carrier case for a plant, a fruit or a pet.

These objects and advantages of the present invention will be better understood from the following detailed description, accompanying drawings and test examples.

DETAILED DESCRIPTION OF THE PREFERRED EMBODIMENTS OF THE INVENTION

Figure 1:
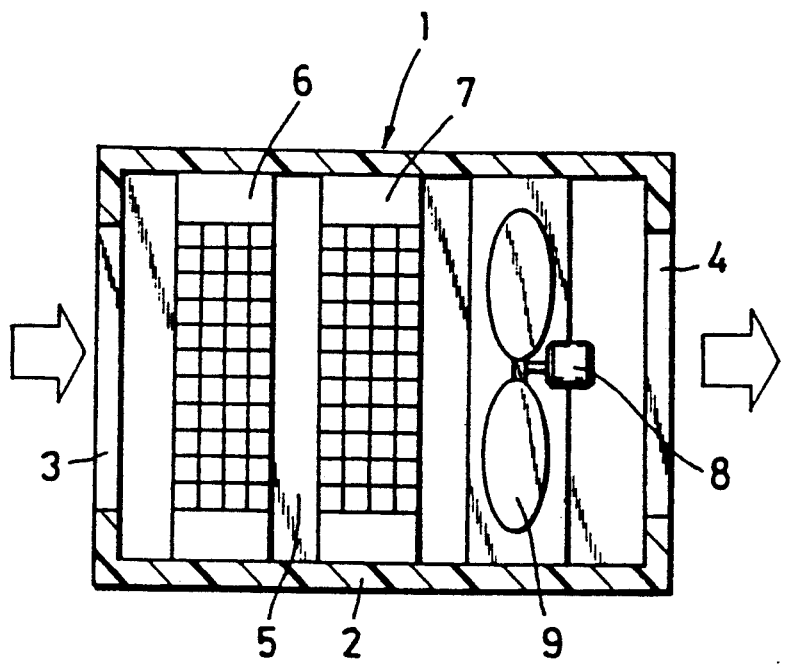
FIG. 1 is a schematic sectional view showing a gas treating apparatus embodying the principles of the invention.

The iodine-supporting activated carbon honeycomb can be obtained by supporting iodine and/or an inorganic iodide on an activated carbon honeycomb. As the activated carbon honeycomb mentioned above, a honeycomb with an activated carbon content of not less than about 30% can be employed. The activated carbon honeycomb may contain various conventional binders.

The BET specific surface area of the activated carbon honeycomb is generally not less than 200 m$^2$/g, preferably not less than 400 m$^2$/g and more desirably not less than 500 m$^2$/g. The activated carbon honeycomb having such a specific surface area exhibits an enhanced adsorbent capacity. The number of cells in the activated carbon honeycomb is about 10 to 1,500 cells/square inch, preferably about 20 to 1,000 cells/square inch and more preferably about 25 to 750 cells/square inch. Such a number of cells in the honeycomb provides a low flow resistance without lowering the adsorption capacity. The activated carbon honeycomb can be used singly, as one layer, or in combination with a plurality of the honeycombs, as plural layers. The thickness of the activated carbon honeycomb can be selected within the range which insures a sufficient deodorizing efficiency, this being not less than about 5 mm per layer, preferably not less than 7.5 mm per layer (e.g. about 7.5 to 100 mm) and more preferably not less than 10 mm (e.g. about 10 to 30 mm) per layer.

The inorganic iodide above includes, for example, $I_2O_5$, $NH_4I$ and various metal iodides. Among such metal iodides are iodides of alkali metals, such as LiI, NaI, $NaIO_3$, KI, $KI_3$, $KIO_3$, RbI, CsI, iodides of alkaline earth metals, such as $CaI_2$, $SrI_2$, $BaI_2$, $MgI_2$, iodides of group Ib metals of Periodic Table of Elements, such as CuI, $CuI_2$, AgI, iodides of group IIb metals of Periodic Table of Elements, such as $ZnI_2$, iodides of group III metals of Periodic Table of Elements, such as $AlI_3$, iodides of group VI metals of Periodic Table of Elements, such as $CrI_3$, iodides of group VII metals of Periodic Table of Elements, such as $MnI_2$, and iodides of group VIII metals of Periodic Table of Elements, such as $CoI_2$, $NiI_2$. The preferred inorganic iodides are $NH_4I$, $KIO_3$, iodides of alkali metals, $CoI_2$, $NiI_2$ and $ZnI_2$. Particularly preferred are iodides of alkali metals, with potassium iodide being one of the most preferred. Iodine and inorganic iodides can be used alone or in combination.

Iodine and/or inorganic iodides can be supported on an activated carbon honeycomb in a conventional manner. A typical method may comprise dissolving or dispersing iodine and/or the inorganic iodide in water or an organic solvent such as an alcohol and treating the activated carbon honeycomb with the solution or dispersion by spraying, impregnation or dipping. An alternative method may comprise mixing iodine and/or the inorganic iodide, in the form of a solution or finely divided powder, along with the carbon starting material for subsequent molding into a honeycomb. Alternatively, in the case of iodine, the activated carbon honeycomb may be dusted with iodine in the form of solid powder and then heated to a temperature of 100° to 115° C. As a further alternative, the activated carbon honeycomb may be caused to adsorb iodine in the form of a liquid or gas or treated with an aqueous solution of KI, $NH_4I$ or a similar iodine source by spraying, impregnation or dipping. If necessary, the activated carbon honeycomb supporting iodine and/or inorganic iodide may be dried or sintered.

The proportion of iodine and/or inorganic iodide to activated carbon honeycomb can be selected from the range which insures a sufficient adsorption/elimination capacity for malodorous and harmful gaseous components. Thus, in terms of iodine, the range may be about 0.1 to 40 weight %, preferably about 0.2 to 20 weight %, and more preferably about 0.4 to 10 weight %.

The above iodine-supporting activated carbon honeycomb shows a high deodorizing/adsorbing capacity for a variety of malodorous and harmful gaseous components. Particularly, it shows a remarkably high deodorizing/adsorbing capacity for sulfur-containing compounds such as hydrogen sulfide, methylmercaptan and other mercaptans, sulfides, amines such as monomethylamine, dimethylamine, trimethylamine, and aldehydes such as formaldehyde and acetaldehyde. The deodorizing/adsorbing capacity for sulfur-containing compounds is especially remarkable. Moreover, because of its honeycomb structure, the honeycomb of the invention features a low flow resistance and is, therefore, capable of smooth deodorization and adsorption. Therefore, in the gas treating method of the invention, a gas containing malodorous and harmful components can be treated using at least one iodine-supporting activated carbon honeycomb.

An iodine-supporting activated carbon in pellet form has been used in a limited field such as an apparatus for treating an industrial exhaust gas. It has been very difficult to apply such an activated carbon to inexpensive daily necessaries, because it is not easy to handle because of its pellet form. However, the iodine-supporting activated carbon honeycomb can be applied to inexpensive daily necessaries. A carbon honeycomb is easy to handle. Therefore, it can have a variety of uses in various fields.

For more efficient removal of malodorous and harmful components, it is preferable to treat a gas with the iodine-supporting activated carbon honeycomb in combination with at least one activated carbon honeycomb selected from the group consisting of an acid-supporting activated carbon honeycomb, a bromine-supporting activated carbon honeycomb, a platinum group element-supporting activated carbon honeycomb and a non-chemical-supporting activated carbon honeycomb.

By treating a gas with the iodine-supporting activated carbon honeycomb in combination with the acid-supporting activated carbon honeycomb, such odor components and harmful components as ammonia, amines, aldehydes and sulfides can be adsorbed and removed with increased efficiency.

The acid-supporting activated carbon honeycomb can be obtained by supporting an acid on the activated carbon honeycomb. The acid includes, for example, inorganic acids such as phosphoric acid, sulfuric acid, nitric acid, and organic acids such as oxalic acid, malonic acid, tartaric acid, succinic acid, citric acid, malic acid and glutaric acid. Any of the acids can also be used alone or in combination. Among the preferred acids are phosphoric acid, oxalic acid and malic acid. The more preferred acid is phosphoric acid. As typical examples of the phosphoric acid, there may be mentioned orthophosphoric acid, metaphosphoric acid and polyphosphoric acid (acyclic polyphosphoric acids such as pyrophosphoric acid, cyclic polyphosphoric acids such as trimetaphosphoric acid, tetrametaphosphoric acid, and linear polymetaphosphoric acids). Among the preferred phosphoric acids is orthophosphoric acid. These phosphoric acids can be used alone or in combination with other acids.

Supporting of an acid on the activated carbon honeycomb can also be effected according to the conventional procedure. For example, an acid can be supported on the activated carbon honeycomb by treating the activated carbon honeycomb with the acid, either in the form of an aqueous solution or dispersion, by spraying, impregnation or dipping. Alternatively the acid, either as it is or in the form of an aqueous solution or dispersion, can be mixed with the starting carbon material for subsequent molding into a honeycomb. If necessary, the resulting acid-supporting activated carbon honeycomb may be dried or sintered.

The proportion of the acid to the activated carbon honeycomb may for example be about 1 to 60 weight %, preferably about 2 to 50 weight % and more preferably about 5 to 40 weight %.

Where the gas to be treated contains lower unsaturated hydrocarbons such as ethylene and acetylene, it is advantageous to use the iodine-supporting activated carbon honeycomb in combination with a bromine-supporting activated carbon honeycomb or a platinum group element-supporting activated carbon honeycomb. It is well known that a plant or fruit can produce lower unsaturated hydrocarbons, such as ethylene, which lower the freshness thereof and adjacent plants or fruits in a closed space. In this case, malodorous and harmful components and lower unsaturated hydrocarbons in a gas can be adsorbed and removed by use of the iodine-supporting activated carbon honeycomb in combination with a bromine-supporting activated carbon honeycomb or a platinum group element-supporting activated carbon honeycomb to maintain the freshness of the plant or fruit. A combination with a platinum group element-supporting activated carbon honeycomb is preferable.

A bromine-supporting active carbon honeycomb can be prepared by applying liquid bromine to a substrate of activated carbon honeycomb by spraying, impregnation or dipping, or by contacting gaseous bromine thereto. The amount of supported bromine relative to the activated carbon honeycomb is 1 to 30 weight %, preferably 2 to 20 weight % and more desirably 5 to 15 weight %.

Where the gas to be treated contains nitrogen oxides, carbon monoxide, hydrogen cyanide, lower aldehydes, lower unsaturated hydrocarbons, for example ethylene or propylene, it is advantageous to use the iodine-supporting activated carbon honeycomb in combination with a platinum group metal-supporting activated carbon honeycomb.

The platinum group element includes, among others, platinum, iridium, osmium, palladium, rhodium, rutenium as well as gold. The platinum group element may be supported on an activated carbon honeycomb as the element or a compound containing the platinum group element. The platinum group element or the compound containing the platinum group element is supported on the activated carbon honeycomb in an amount of from 0.1 to 20 weight %, preferably 0.25 to 15 weight %, and more desirably 0.5 to 10 weight %, in terms of platinum group element, relative to the activated carbon honeycomb.

A chemical-supporting activated carbon honeycomb supporting such a platinum group element can be prepared by a method which comprises applying a solution of a platinum group element containing compound in hydrochloric acid, hydrobromic acid, hydroiodic acid, hydrofluoric acid, nitric acid, sulfuric acid, phosphoric acid or the like by spraying, impregnation or dipping. As an alternative, a solution of said compound in any of said acids is mixed with the starting carbon materials before molding into the desired honeycomb. Where necessary, the honeycomb may be dried or sintered by conventional techniques. The drying or sintering temperature is 40° to 500° C., preferably 50 to 400° C. and more preferably 60° to 350° C. The drying or sintering can be conducted at subatmospheric, atmospheric or superatmospheric pressure in the presence of air, nitrogen gas, carbon dioxide gas or hot combustion gases.

The effect of gas treatment is enhanced when, as the chemical supported, a compound of a platinum group element is used in combination with at least one member of the group consisting of compounds of Ti, V, Cr, Mn, Fe, Co, Ni, Cu and Ag. Such a honeycomb can be manufactured in the same manner as the chemical-supporting activated carbon honeycomb supporting a platinum group compound alone. The metal may be supported on an activated carbon honeycomb as the free metal or as a compound containing the metal. Such metal or compound containing the metal is supported on the activated carbon honeycomb in the range of from 0.1 to 500, preferably 0.5 to 250 and more preferably 1 to 100 of the weight ratio (metal/platinum group element). Like the activated carbon honeycomb supporting the platinum group compound, this honeycomb can be dried or sintered if necessary. The drying or sintering temperature is 40° to 500° C., preferably 50° to 400° C. and more preferably 60° to 350° C. The drying or sintering can be conducted at subatmospheric, atmospheric or superatmospheric pressure in the presence of air, nitrogen gas, carbon dioxide gas or hot combustion gases.

For the treatment of tobacco smoke, it is advantageous to concomitantly use an activated carbon honeycomb supporting either a platinum group element compound or both a platinum group element compound and any of the above-mentioned metal compounds, whereby carbon monoxide, hydrogen cyanide and ethylene can be successfully eliminated.

These activated carbon honeycombs can best be used, in various combinations, only if the iodine-supporting activated carbon honeycomb is included. By utilizing a plurality of activated carbon honeycombs having varying adsorbent affinities for malodorous components, even a gas containing many kinds of malodorous or toxic components can be efficiently eliminated.

Compared with the usual activated carbon honeycomb, the above-described iodine-supporting activated carbon honeycomb exhibits a remarkably improved deodorizing/adsorbing capacity for malodorous and/or toxic components. Thus, there is no limitation on the order of treatment with the iodine-supporting activated carbon honeycomb and other activated carbon honeycombs such as said acid-supporting honeycomb. Thus, the gas to be treated may be first treated with the iodine-supporting activated carbon honeycomb or with the acid-supporting activated carbon honeycomb. The preferred method comprises treating a gas first with the iodine-supporting activated carbon honeycomb and then with the acid-supporting activated carbon honeycomb. Another preferred method comprises treating a gas first with the iodine-supporting activated carbon honeycomb and then, with the platinum group element-supporting activated carbon honeycomb or the bromine-supporting activated carbon honeycomb. Among them, the platinum group element-supporting activated carbon is more preferably used. Another preferred method comprises treating a gas successively with a iodine-supporting activated carbon honeycomb, an acid-supporting activated carbon honeycomb and then with a bromine-supporting activated carbon honeycomb or a platinum group element-supporting activated carbon honeycomb to maintain freshness of a plant or fruit in a case or box. In this instance, the adsorption and elimination process can be carried out using at least one unit including one each of said iodine-supporting activated carbon honeycomb and said acid-supporting activated carbon honeycomb.

The iodine-supporting activated carbon honeycomb can also be used in combination with the non-chemical-supporting activated carbon honeycomb. In this instance, an improvement in adsorption and elimination can also be realized. Particularly where the material gas contains such malodorous and toxic substances as hydrocarbons and carboxylic acids, it is advantageous to dispose an activated carbon honeycomb upstream of the iodine-supporting activated carbon honeycomb and within a gas passageway. In the adsorption and elimination of gases containing certain components, particularly sulfur-containing compounds, at least one unit of the iodine-supporting activated carbon honeycomb and of the activated carbon honeycomb may be employed.

When the material gas contains finely divided solids such as dust, tar, nicotine, etc., a dust filter is preferably installed upstream of the activated carbon honeycomb and iodine-supporting activated carbon honeycomb in a gas passageway. There is no limitation on the type of dust filter but among electric dust collector-type filters, static charge filters, nonwoven fabric filters and those which can be easily changed with fresh ones are particularly preferred.

In the treatment of a material gas containing malodorous and harmful components, the gas may be treated using a dust filter, an activated carbon honeycomb, a bromine-supporting activated carbon honeycomb, a platinum group element-supporting activated carbon honeycomb, an acid-supporting activated carbon honeycomb and an iodine-supporting activated carbon honeycomb in an appropriate combination. The temperature of the malodorous gas is allowed to vary only if the efficiency of adsorption by the honeycomb or honeycombs will not be adversely affected. Thus, it may range from about $-50°$ C. to $100°$ C., preferably about $-30°$ C. to $80°$ C., and more preferably about $-20°$ C. to $65°$ C.

In contacting the material gas containing malodorous and harmful components with said honeycomb, the linear velocity of the material gas may for example be about 1 to 200 cm/sec., preferably about 2 to 150 cm/sec., and more preferably about 5 to 100 cm/sec. The space velocity of the gas may for example be about 20 to 500,000 $hr^{-1}$, preferably about 50 to 250,000 $hr^{-1}$ and more preferably 100 to 150,000 $hr^{-1}$.

The iodine-supporting activated carbon honeycomb of the present invention can be used in gas treating apparatus for the adsorption and removal of malodorous and harmful components from a variety of gases. FIG. 1 is a schematic sectional view showing a gas treating apparatus of the invention and FIG. 2 is a schematic view showing the relationship of the space to be treated with the gas treating apparatus.

The gas treating apparatus 1 comprises a casing 2 formed with a gas inlet 3 and a gas outlet 4 at both end portions, an iodine-supporting activated carbon honeycomb 6 and an acid-supporting activated carbon honeycomb 7 which are disposed in a gas passageway 5 extending from the gas inlet 3 to the gas outlet 4, and a fan 9 which is connected to a motor 8 which is a driving means.

Figure 2:
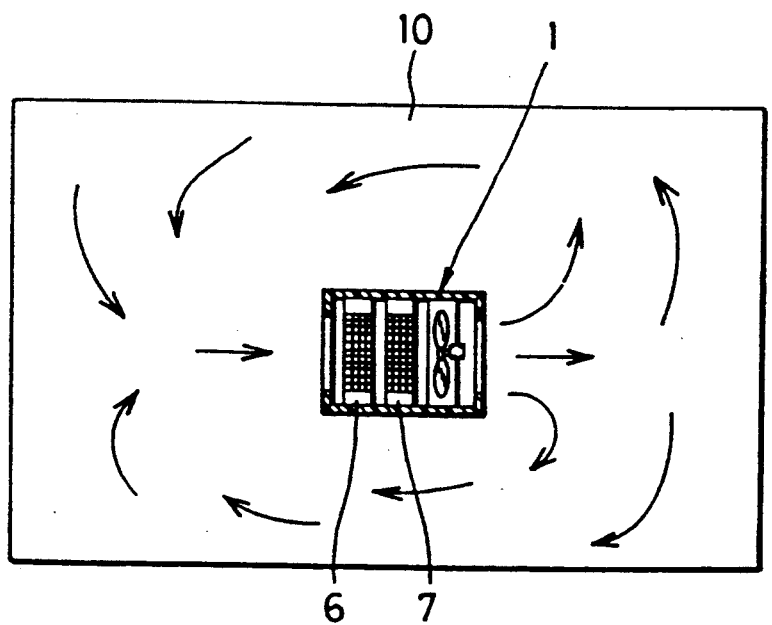
FIG. 2 is a schematic view illustrating the relationship of the space to be treated with the gas treating apparatus.

When this apparatus 1 is installed in a space 10 to be treated as illustrated in FIG. 2, the fan 9 drives a material gas from the gas inlet 3 to the gas outlet 4. In the resulting flow of material gas, the gas is first treated with the iodine-supporting activated carbon honeycomb 6, whereby most of the malodorous and harmful components are removed. In addition, even if ammonia or other substances occur in minute amounts in the treated gas, they are then adsorbed and removed by the acid-supporting activated carbon honeycomb 7. Moreover, since the fan 9 is disposed on the downstream side of the gas passageway 5, i.e. between the acid-supporting activated carbon honeycomb 7 and the gas outlet 4 in this embodiment, fouling of the motor 8 and fan 9 and corrosion thereof with malodorous and harmful components of the gas are prevented, with the result that the apparatus may continue to operate with sustained efficiency for a long period of time.

Figure 3:
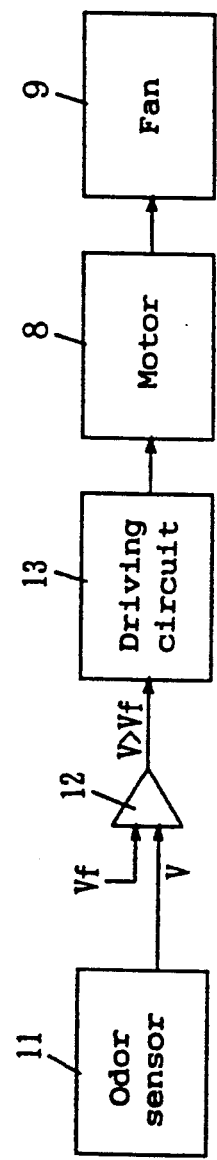
FIG. 3 is a block diagram showing the electrical system for a deodorizing apparatus of the invention.

The actuation of the fan 9 by the driving means may be switched on and off with a suitable means, such as a manual switch, but is preferably switched automatically by means of an odor sensor or the like. FIG. 3 is a block diagram showing an electrical system for the gas treating apparatus of the invention. In this embodiment, the gas treating apparatus is a deodorizer.

In the following description, like numerals are used to designate like parts or elements.

Referring to FIG. 3, the deodorizing apparatus includes an odor sensor 11 for detecting a bad odor, and a motor 8, as a driving means, for driving a fan 9 in accordance with a detection signal from the sensor 11. A comparator 12 compares the detection value V of the sensor 11 with a reference value Vf set in a setting circuit, and when the detection value V exceeds the reference value Vf (V>Vf), a driving signal is applied through a driving circuit 13 to the motor 8, and the motor 8 drives the fan 9 to initiate deodorization.

In this arrangement, the motor 8 can be driven only when the concentration of the bad odor exceeds the reference level, for example, a concentration which can be just detected by olfactory sense, ensuring an effective utilization of the iodine-supporting active carbon honeycomb and the other activated carbon honeycombs.

Figure 4:
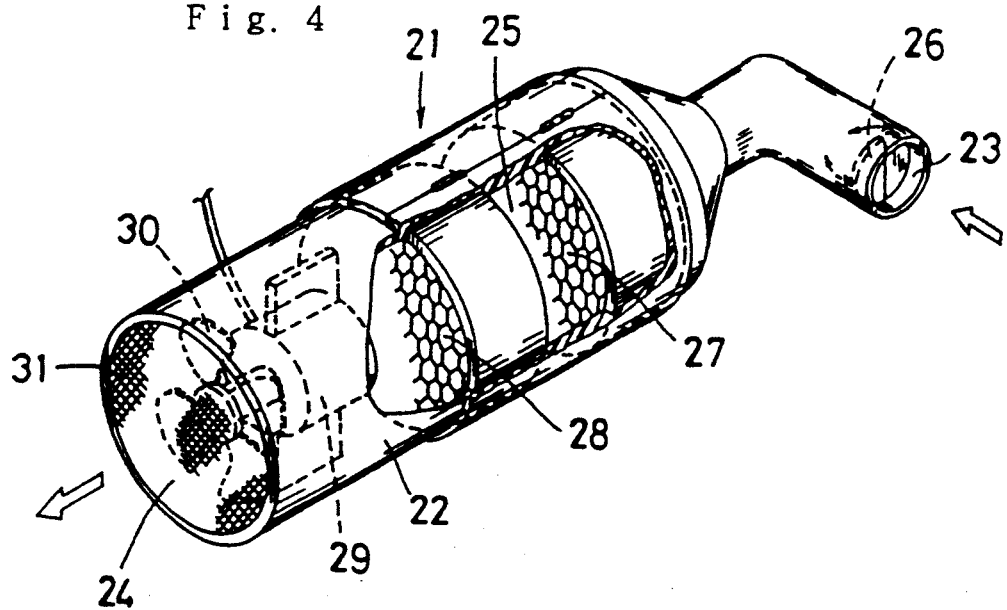
FIG. 4 is a partially exploded schematic perspective view showing a toilet deodorizing apparatus.
Figure 5:
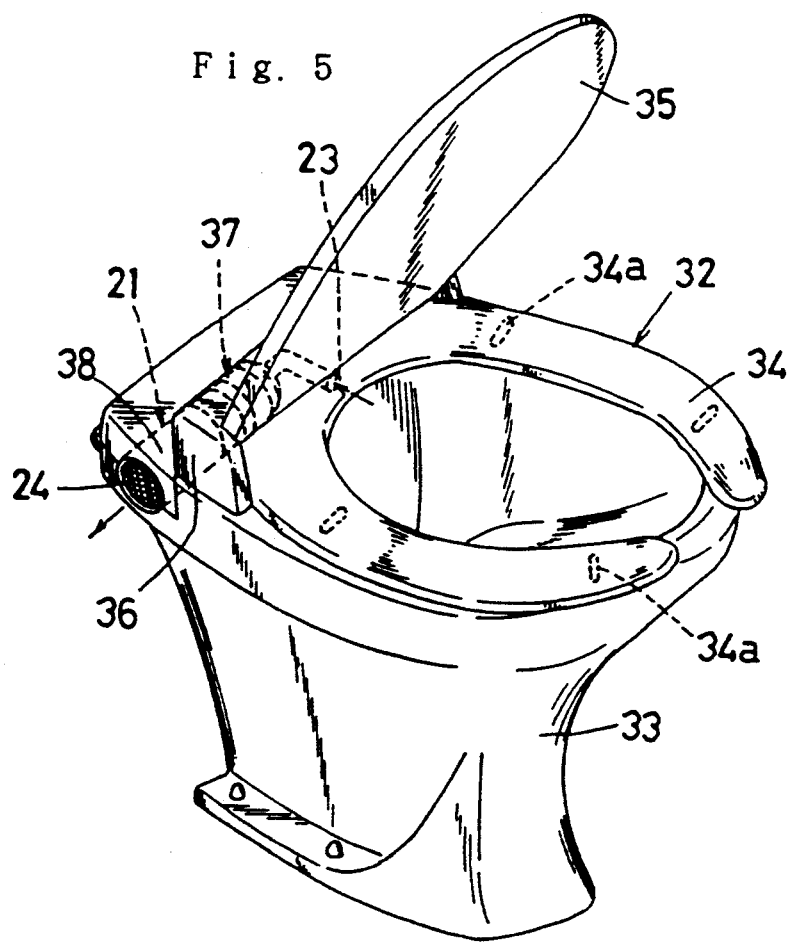
FIG. 5 is a schematic perspective view showing a toilet provided with the deodorizing apparatus of FIG. 4.

FIG. 4 is a partially exploded schematic perspective view showing a toilet deodorizing apparatus and FIG. 5 is a schematic perspective view showing a Western-style toilet provided with the deodorizing apparatus shown in FIG. 4.

This deodorizing apparatus 21 comprises a hollow cylindrical casing 22 defining a gas duct 25 having a suction port 23 to be disposed within a toilet bowl 33 and an exhaust port 24 to be disposed outside the bowl 33, a damper 26 disposed in a portion of said casing 22 which is closer to the suction port 23, an iodine-supporting activated carbon honeycomb 27 and an acid-supporting activated carbon honeycomb 28 both of which are disposed along the direction defined by the suction port 23 and the exhaust port 24 in that sequence respectively, and a motor 29 and a fan 30 which are disposed downstream of the acid-supporting activated carbon honeycomb 28, that is to say, closer to the exhaust port 24 side of the gas duct. The damper 26 is disposed so as to open or close the gas duct 25 on the suction port 23 side according to the action of the fan 30. The portion of said casing 22 which is close to the suction port 23 is L-configured.

Moreover, in order that the iodine-supporting activated carbon honeycomb 27 and acid-supporting activated carbon honeycomb 28 may be dismounted and remounted as desired, the corresponding portion of the casing 22 is constituted so that it can be freely swung open and closed by a hinge.

The exhaust port 24 of the casing 22 is provided with a mesh-type or otherwise gas-permeable protective member 31 for preventing fouling of the fan 30.

The above deodorizing apparatus 21 can be installed in such a manner that the suction port 23 thereof is disposed internally of the toilet bowl 33 and the exhaust port 24 externally of the toilet bowl 33. Thus, as illustrated in FIG. 5, the toilet 32 comprises a toilet bowl 33, a stool seat 34 and a cover 35, with a stool seat box 36 disposed at the base of said stool seat 34. The stool seat 34 is provided with projections 34a which are adapted to contact the top circumferential edge of the toilet bowl 33. The rear part of the bowl 33 which is closer to a cistern or flushing water tank (not shown) is formed with a receptor means 37 for accepting said deodorizing apparatus 21 and this receptor means 37 can be covered or exposed by a cover 38 in a hinged arrangement. The receptor means 37 extends in the shape of the letter L from a side opening in the bowl 33 to an inner opening as illustrated. Thus, the receptor is complementary to said deodorizing apparatus in shape and size. Therefore, the deodorizing apparatus 21 can be mounted and dismounted with respect to the receptor means 37 of the bowl 33 after opening said cover 38.

With this deodorizing apparatus 21, the malodorous component, such as urine odor, within the toilet 32 is aspirated by the fan 30 associated with the motor 29 from the suction port 23 through the damper 26, brought into contact with the iodine-supporting activated carbon honeycomb 27 and the acid-supporting activated carbon honeycomb 28, in that order, and finally exhausted from the exhaust port 24. In this arrangement, since the iodine-supporting activated carbon and acid-supporting activated carbon are each in the form of a honeycomb, not only is the flow resistance low but the flow of gas is made to be uniform so that the iodine-supporting activated carbon honeycomb 27 and the acid-supporting activated carbon honeycomb 28 are efficiently supplied with the gas to be treated.

As a result, the malodorous components are thoroughly eliminated by the iodine-supporting activated carbon honeycomb 27 and the acid-supporting activated carbon honeycomb 28. The corrosion of the motor 29 and the fan 30 can be prevented and, hence, a high deodorizing efficiency can be maintained over a long term. Moreover, since a suction force is applied by the fan 30 which is disposed closer to the exhaust port of the casing 22, the malodorous components can be drawn positively even in the presence of assembling clearances with respect to said honeycombs 27,28, cracks or pinholes of the casing 22 or other parts with the result that malodorous components do not escape from the apparatus. In addition, because the iodine-supporting activated carbon and acid-supporting activated carbon are in the honeycomb form, the respective honeycombs 27,28 can be easily replaced with fresh ones. Mounting and dismounting of the deodorizing apparatus 21 with respect to the receptor 37 of the toilet bowl 33 through the cover 38 is also easy. Moreover, since the damper 26 is operative in response to the action of the motor 29 and fan 30 opens the gas duct 25 only while the motor 29 is operating and closes it at other times, and the activated carbon honeycombs can be utilized effectively and efficiently with a suppressed loss of their adsorbent activity.

It should be understood that the casing need not be in the bent form but may be provided in any appropriate form as long as the suction port and exhaust port can be disposed internally and externally of the toilet bowl, respectively. Furthermore, the motor of the deodorizing apparatus may be actuated by inserting a plug connected to the motor into a household power outlet or by means of an appropriate means such as a switch provided within the toilet user's reach. However, it is preferable to arrange the apparatus so that the motor is automatically started by a sensor which senses urination, defecation, sitting on the stool seat or leaving the stool seat. Since the malodor remains within the toilet 32 for some time after urination or defecation, it is preferable to keep driving the motor 29 for an optimum time after urination or defecation. Setting the stool cover 35 down onto the stool seat after leaving the seat 34 prevents the malodor from leaking out from the toilet 32, thus contributing to an enhanced air freshening effect.

Figure 6:
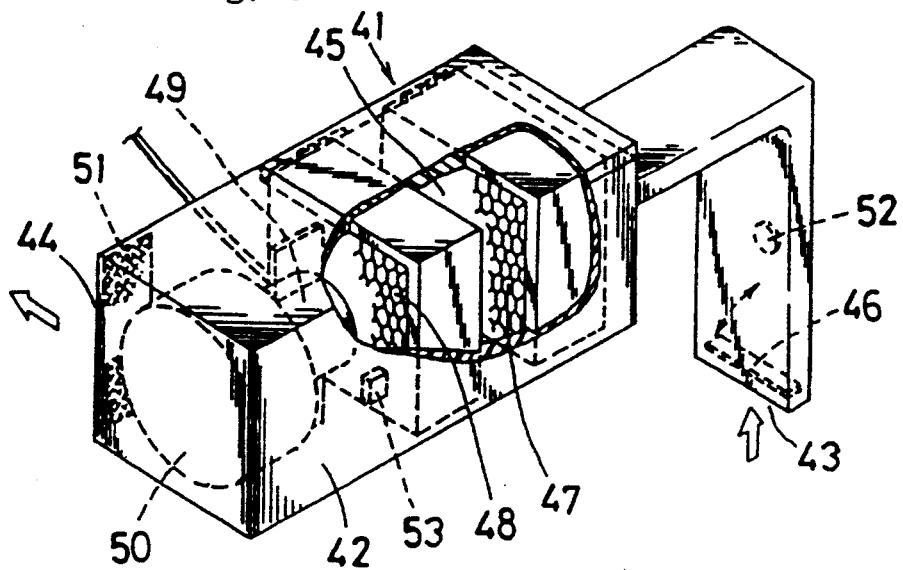
FIG. 6 is a partially exploded schematic perspective view showing another embodiment of the invention.
Figure 7:
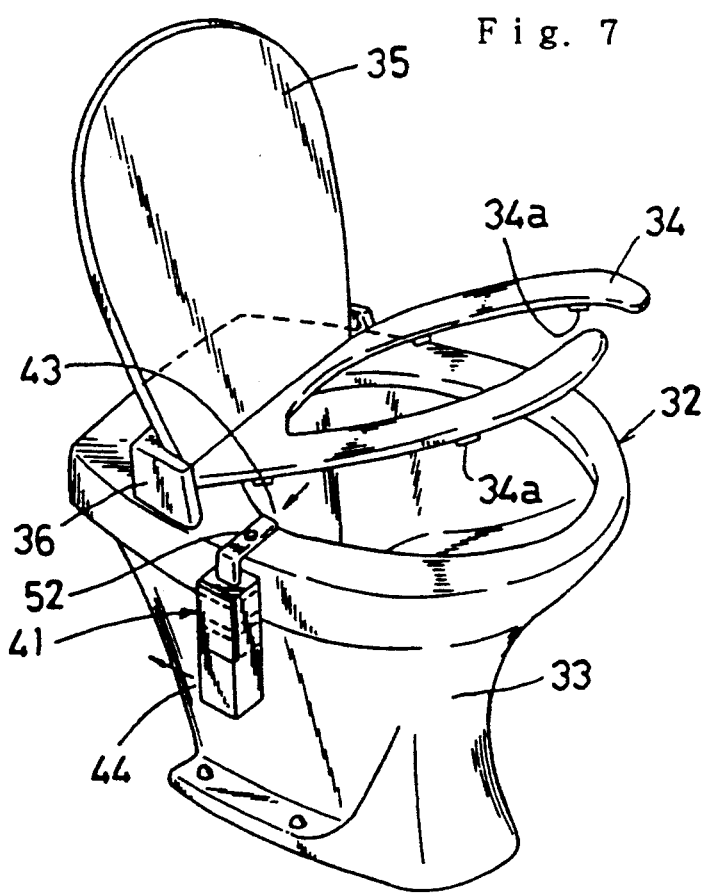
FIG. 7 is a schematic perspective view showing a toilet provided with the deodorizing apparatus shown in FIG. 6.

FIG. 6 is a partially exploded schematic perspective view showing another embodiment of the invention and FIG. 7 is a schematic perspective view showing a toilet provided with the deodorizing apparatus of FIG. 6.

Referring to FIGS. 6 and 7, the deodorizing apparatus 41 is designed with attention to the clearance formed between the top circumferential surface of the bowl 33 and the underside of the stool seat due to the presence of projections 34a on the underside of the stool seat 34. Thus, the portion of the casing 42 closer to the suction port 43 is formed with a thickness corresponding to said clearance and bent in the form of the letter L for hooking over the rim and suspending from the rim of the bowl 33.

An iodine-supporting activated carbon honeycomb 47 and an acid-supporting activated carbon honeycomb 48 are disposed in a gas duct 45, defined by a casing 42, extending from a suction port 43 to an exhaust port 44. The portion of the casing 42 corresponding to these honeycombs 47,48 can be opened or closed by a hinge, thus the respective honeycombs 47,48 can be easily replaced with fresh ones.

Moreover, the portion of the casing 42 on the suction port 43 side, which is to face said stool seat 34, is provided with an automatic switch 52, such as a photosensor, a pressure switch, a pressure sensor, an odor sensor or a temperature sensor, which detects the user's sitting on the stool seat 34 and actuates the motor 49. A damper 46 is disposed in a portion of caasing 42 which is close to the suction port 43. In addition, a sirocco fan 50 driven by a motor 49 is disposed at the downstream side of the honeycombs 47,48. The exhaust port 44 of the casing 42 is provided with a gas-permeable protective member 51.

Malodorous components remain within the toilet 32 after defecation or urination. Therefore, in order that the fan 50 may be driven by the motor 49 for a predetermined time even after the user leaving the stool seat 34, it is so arranged that, leaving the stool seat 34 triggers a built-in timer 53 on the casing 42 in response to the leaving detection signal from the automatic switch 52 to control the operation time of the motor 49.

For secure setting of the deodorizing apparatus, the part of the underside of the casing 42 which corresponds to the circumferential part of the bowl 33 may be formed with a recess or the portion of casing 42 which is close to the suction port 43 may be provided with a fixing means adapted to engage the bowl 33.

The time to be set on said timers 53 may be chosen with reference to the capacity of the motor 49, it is preferable to arrange so that the motor 49 may be driven for at least 10 seconds after the user has left the stool seat 34.

Figure 8:
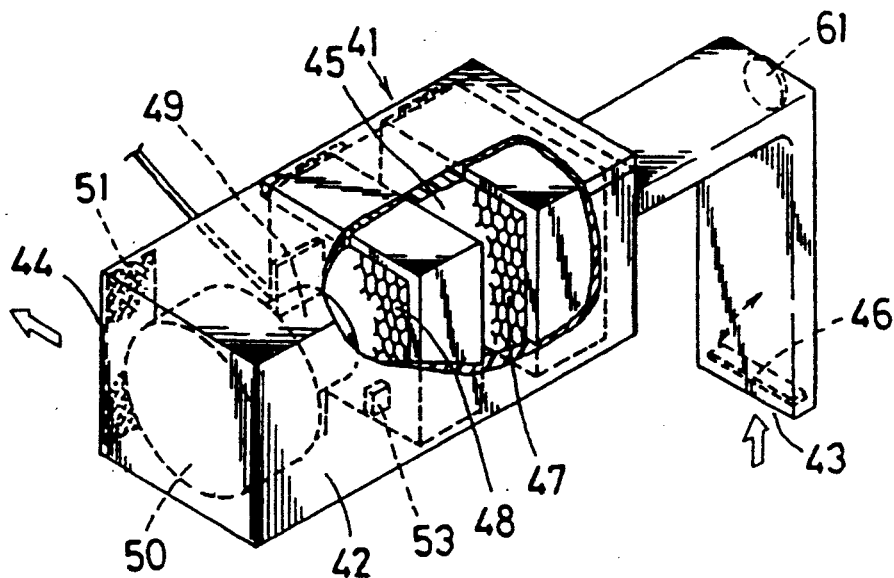
FIG. 8 is a partially exploded schematic perspective view showing a deodorizing apparatus as another embodiment of the invention.
Figure 9:
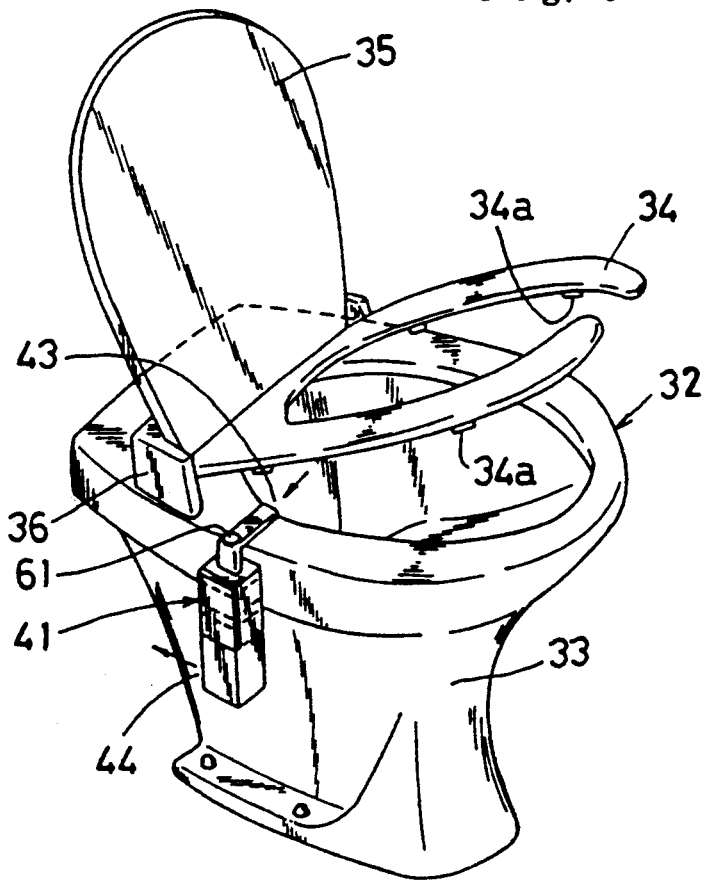
FIG. 9 is a schematic perspective view showing a toilet provided with the deodorizing apparatus illustrated in FIG. 8.

In the practice of the present invention, the type of sensor is suitable if it is capable of sensing defecation, urination, sitting on the stool seat or leaving the seat, but a photosensor such as an infrared beam sensor is preferred. FIG. 8 is a partially exploded schematic perspective view showing another deodorizing apparatus embodying the principles of the invention and FIG. 9 is a schematic perspective view showing a toilet provided with the deodorizing apparatus of FIG. 8.

Here, a photosensor 61 for sensing the user's sitting on the stool seat 34 or leaving the seat 34 is disposed on the upper side portion of the deodorizing apparatus 41 as illustrated. The sensing direction of said photosensor 61 is one in which the user's sitting and leaving can be detected, for example obliquely upwards from the exterior to the interior of the toilet 32. Except that sitting and leaving can be detected by the photosensor 61 in a contactless manner, this deodorizing apparatus functions in a similar manner and is fundamentally similar, in operation and effect, to the apparatus shown in FIGS. 6 and 7.

Figure 10:
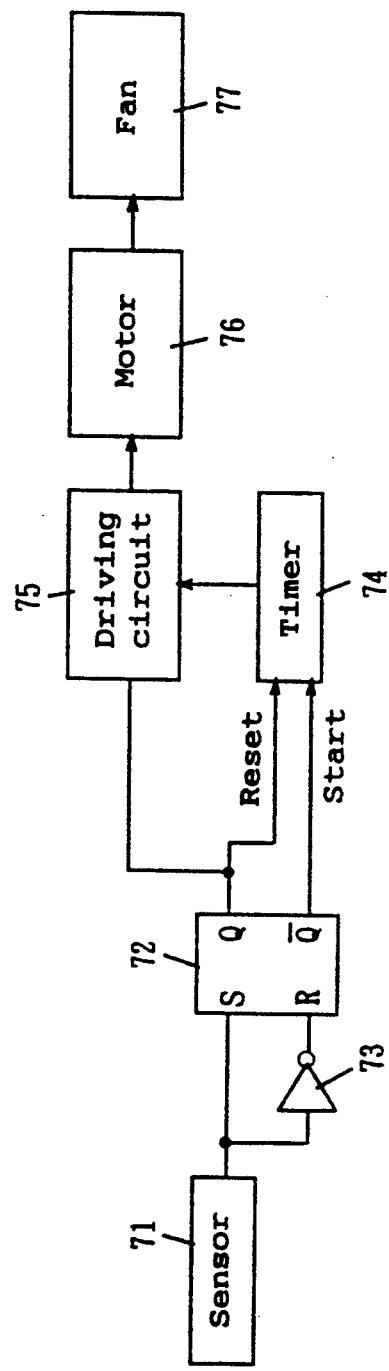
FIG. 10 is a block diagram showing the electrical system for the deodorizing apparatus according to the invention.

Thus, the toilet deodorizing apparatus is preferably provided, as aforesaid, with a sensor for detecting the user's sitting on the stool seat or leaving from the seat, a driving means operative in response to a sitting detection signal from said sensor to drive the fan, and a control means which controls the duration of operation of said driving means in accordance with a detection signal representing the user's leaving the stool seat. FIG. 10 is a block diagram showing the electrical system used in another deodorizing apparatus embodying the principles of the invention.

This deodorizing apparatus is provided with a sensor 71, for example a photosensor, a pressure sensor or similar sensor, for detecting the user's sitting on the stool seat 34 and leaving the stool seat 34. The sitting detection signal from this sensor 71 is fed to an S-terminal of a flip-flop 72 and, at the same time, to an R-terminal of the same flip-flop 72 through an inverter 73. As the sensor 71 senses the user's sitting, the detection signal becomes "1", the flip-flop 72 is set, and the output signal Q of the flip-flop 72 becomes "1". A timer 74 is reset by this output signal Q. In response to the output signal Q, a driving circuit 75 is switched ON so that a driving signal is applied to the motor 76. The motor 76 drives the fan 77 to initiate a deodorizing session.

As the user leaves the stool seat 34 after defecatination or urination, the detection signal of said sensor 71 becomes "0", the flip-flop 72 is reset and the output signal $\overline{Q}$ of the flip-flop 72 becomes "1". This output signal $\overline{Q}$ "1" corresponds to the detection signal representing the user's leaving the stool seat 34. In response to this output signal $\overline{Q}$, the timer 74 starts counting and the driving circuit 75 goes ON so that a driving signal is applied to the motor 76 to drive the fan 77 for a predetermined time. In this manner, the malodorous components stay after defecation or urination can be successfully eliminated. As the time set on the timer 74 runs out, the driving circuit 75 is switched OFF to stop the motor 76.

In the case of this apparatus, the toilet user's sitting on the stool seat 34 causes the fan 77 to turn and resets the timer 74 at the same time. Moreover, leaving the stool seat 34 causes the timer 74 to start counting and allows the fan 77 to keep turning for a preset time so as to efficiently remove the residual malodor.

Figure 11:
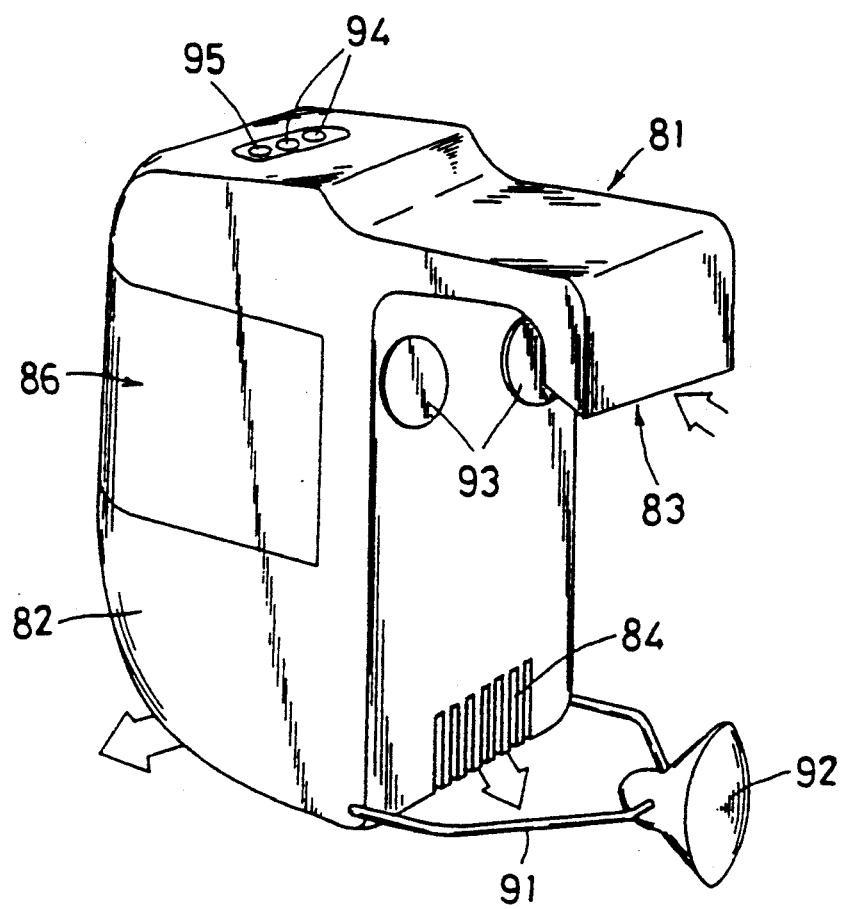
FIG. 11 is a schematic perspective view showing a deodorizing apparatus as a still another embodiment of the invention.
Figure 12:
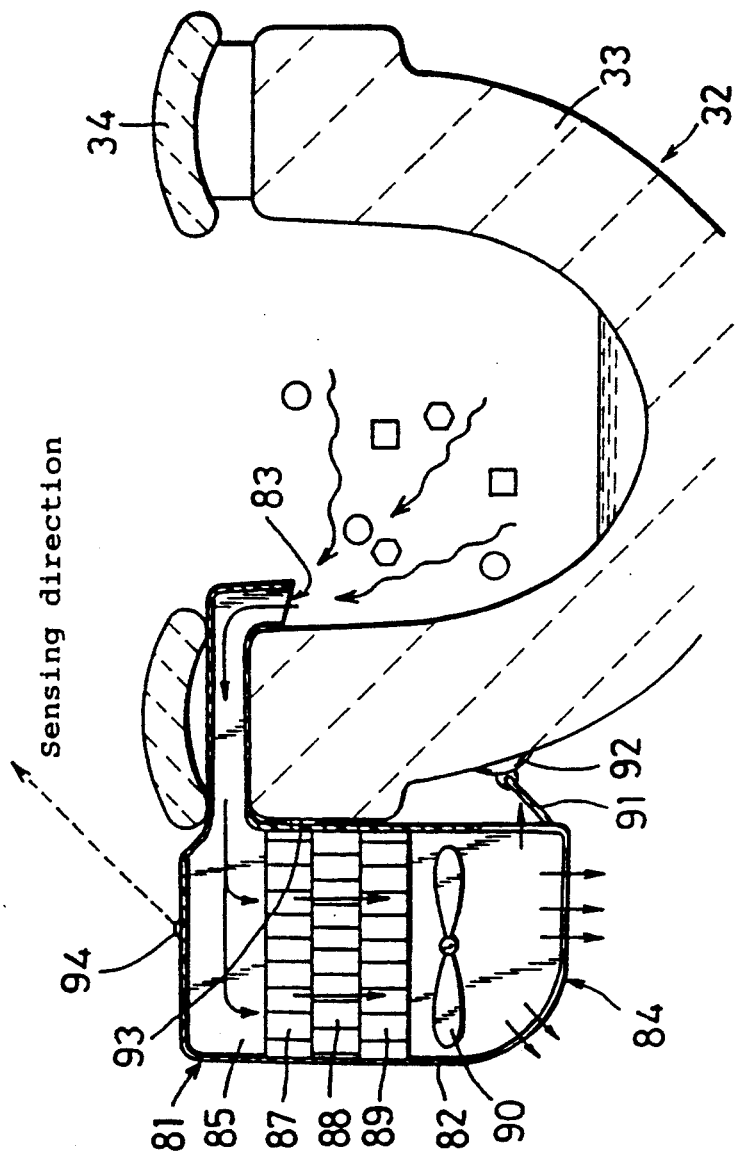
FIG. 12 is a schematic sectional view showing a toilet provided with the deodorizing apparatus shown in FIG. 11.

FIG. 11 is a schematic perspective view showing still another deodorizing apparatus of the invention and FIG. 12 is a schematic cross-section view of a toilet provided with the deodorizing apparatus of FIG. 11.

Referring to FIGS. 11 and 12, this deodorizing apparatus 81 comprises a casing 82 having a suction port 83 and an exhaust port 84 and a snap-on cartridge 86 housing an activated carbon honeycomb 87, an iodine-supporting activated carbon honeycomb 88 and an acid-supporting activated carbon honeycombs 89, all snugly accommodatable in a gas duct 85 extending from said suction port 83 to said exhaust port 84. Disposed downstreams of said gas duct 85 is a fan 90 which is driven by a motor (not shown).

The portion of said casing 82 which is extending from the suction port 83 to said cartridge 86, as accommodated above, is curved in the sectional shape of the letter U and this curved portion can rest on the top circumferential edge of the bowl 33. Moreover, the lower side wall of the casing 82 is provided with a mounting means by which the casing 82 may be mounted and dismounted with respective to the toilet bowl 33. In the illustrated embodiment of FIGS. 11 and 12, said mounting means comprises a flexible supporting member 91 which is secured to the lower side wall of the casing 82 and a suction pad 92 which is secured to said supporting member 91 and can be attached to the side wall of the toilet bowl 33. The supporting member 91 may be a freely rotatable member.

Further, a spacer 93 made of a shockabsorbing material such as sponge or plastic foam is attached to the upper inner side wall of the curved portion of the casing 82. This spacer 93 is abutted against the upper lateral wall of the bowl 33. Therefore, in setting the curved portion of the casing 82 on the peripheral part of the toilet bowl 33, the elasticity of the spacer 93 makes it possible to mount the deodorizing apparatus 81 easily in intimate contact with the bowl 33 and, by means of said mounting means, the deodorizing apparatus 81 so mounted can be easily secured in position. Furthermore, also due to the elasticity of the spacer 93, the deodorizing apparatus can be easily mounted in any position of the toilet bowl 33 even when the edge of the bowl 33 varies somewhat in width.

Disposed at the top of the casing 82 is a photosensor 94 for detecting the user's sitting on the stool seat 34 and his leaving from the stool seat 34 and a warning lamp 95 as a means for alerting the user to the event that the useful life of said activated carbon honeycombs 87,88,89 has run out. Since the sensing direction of said photosensor 94 is obliquely upwards from the exterior to the interior of the toilet 32, the user's sitting on the stool seat 34 and leaving from the seat 34 can be positively detected, irrespective of whether the deodorizing apparatus 81 is installed on the right side of the bowl 33 or on the left side.

Figure 13:
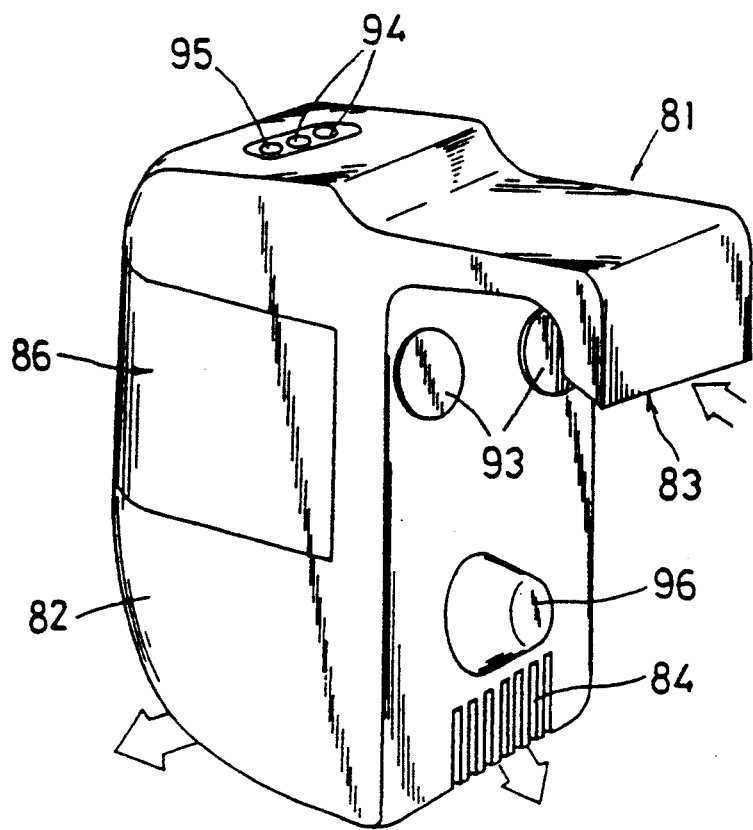
FIG. 13 is a schematic perspective view showing a still further deodorizing apparatus according to the invention.
Figure 14:
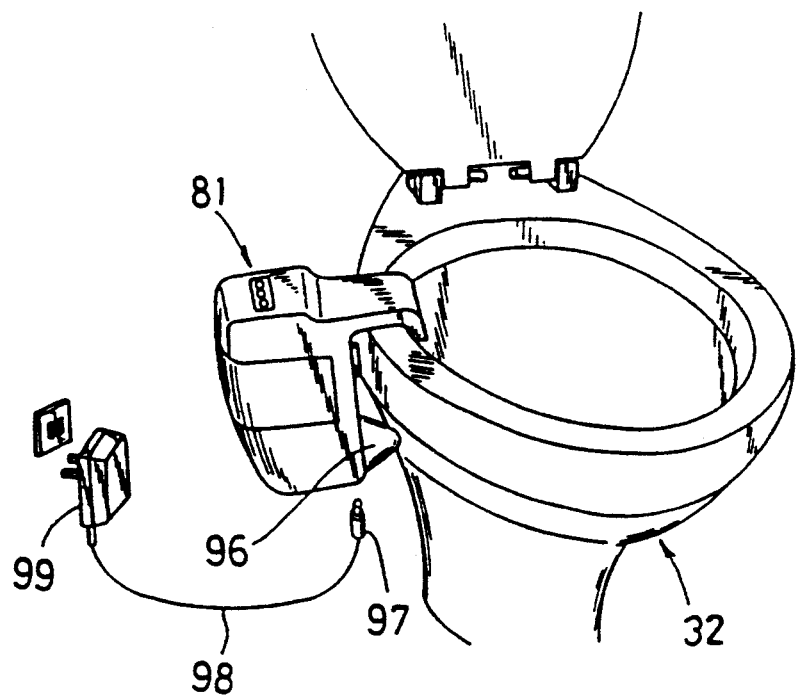
FIG. 14 is a schematic perspective view showing a toilet provided with the deodorizing apparatus shown in FIG. 13.

FIG. 13 is a schematic perspective view showing a still another deodorizing apparatus of the invention and FIG. 14 is a schematic perspective view showing a toilet provided with the deodorizing apparatus of FIG.

13. For facilitating the installation of the deodorizing apparatus on the toilet, this embodiment includes a projecting cushioning member 96 adapted to contact the side wall of the bowl 33, which cushioning member taking the place of the supporting member 91 and suction pad 92 illustrated in FIGS. 11 and 12. It is to be understood that all that is necessary is that the deodorizing apparatus can be attached to the toilet and there is no particular limitation on the means to that end.

Referring to FIG. 14, the underside of the casing 82 of said deodorizing apparatus 81 is formed with a socket (not shown) for a plug 97 which is connected to a power outlet through a cord 98 for driving the motor. The power outlet mentioned above may be a direct current source, such as a storage battery, a dry battery, etc. or an alternating current source. When an alternating current source is used, an adapter 99 for convention of the alternating current to a direct current may be connected to the cord 98 as illustrated. It is also possible to convert a high voltage to a low voltage through said adapter 99. Since the motor can then be driven with a low voltage, the thermal output of the total system including the motor can be reduced to insure added safety.

The deodorizing apparatus is preferably provided with an alerting means for alerting the user to the event that the useful life of the activated carbon honeycomb(s) has run out.

Figure 15:
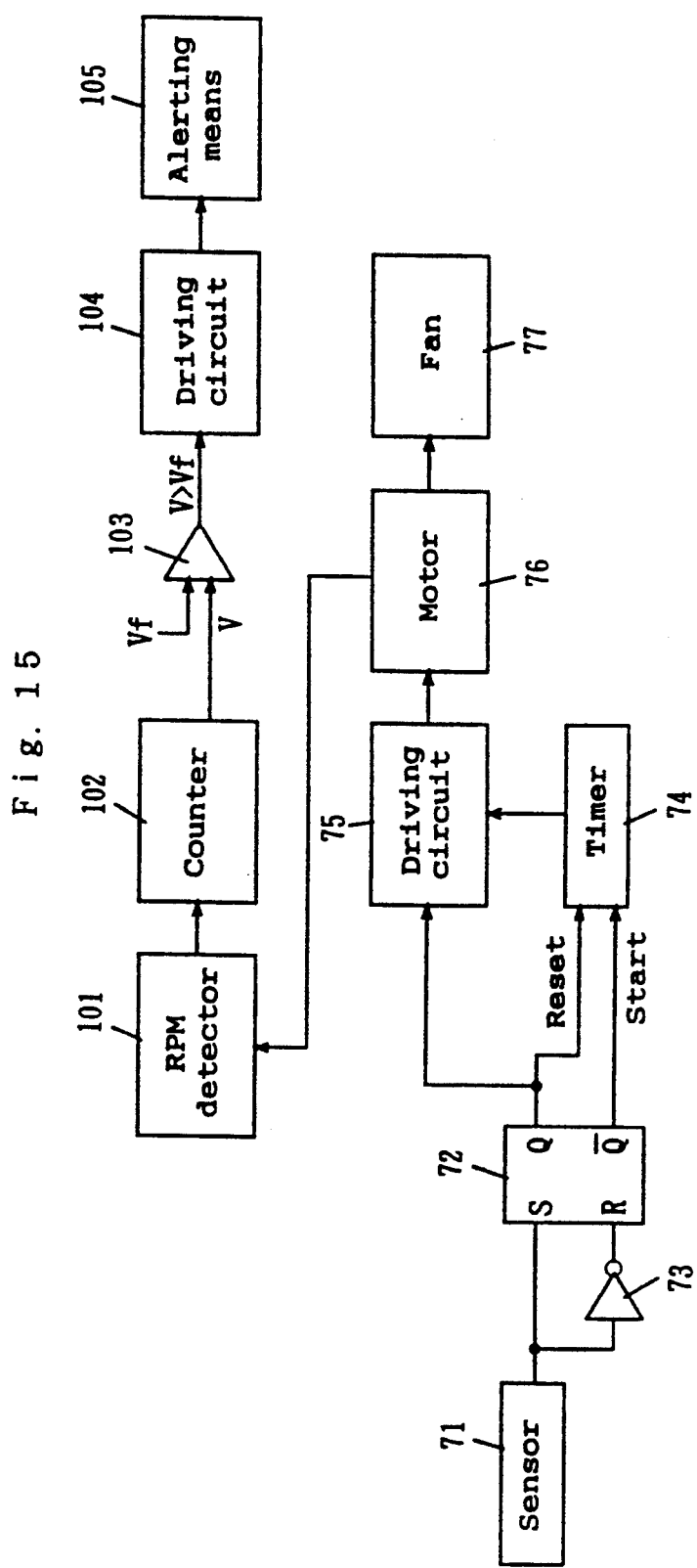
FIG. 15 is a block diagram showing another electrical system for the toilet deodorizing apparatus of the invention.

FIG. 15 is a block diagram showing the electrical system used in a still another deodorizing apparatus of the invention.

This deodorizing apparatus, like the apparatus shown in FIG. 10, is provided with a sensor 71 for detecting the user's sitting on the stool seat 34 and leaving from the stool seat 34, a flip-flop 72, an inverter 73, a timer 74, a driving circuit 75, a motor 76 and a fan 77. Therefore, the user's sitting on the stool seat 34 causes the fan 77 to turn and resets the timer 74, and leaving the stool seat 34 causes the timer 74 to start counting and allows the fan 77 to turn for a predetermined time after defecation or urination.

The operating time and rpm of the motor 74 are detected by an RPM detector 101 and fed to a counter 102. A comparator 103 compares the count value V of the counter 102 with a reference value Vf. This reference value Vf has been set according to the useful life of the activated carbon honeycombs on the rationale that the amount of adsorption of malodor is approximately proportional to the treating time, i.e. the operating time and rpm of the motor 76.

If the result of comparison by said comparator 103 is $V > Vf$, a driving circuit 104 applies a driving signal to an alerting means 105 to alert the user to the fact that it is time to replace the activated carbon honeycombs or said cartridge 86. The alerting means 105 may be a lamp 95 as used in the preceding embodiment, a buzzer or the like.

Figure 16:
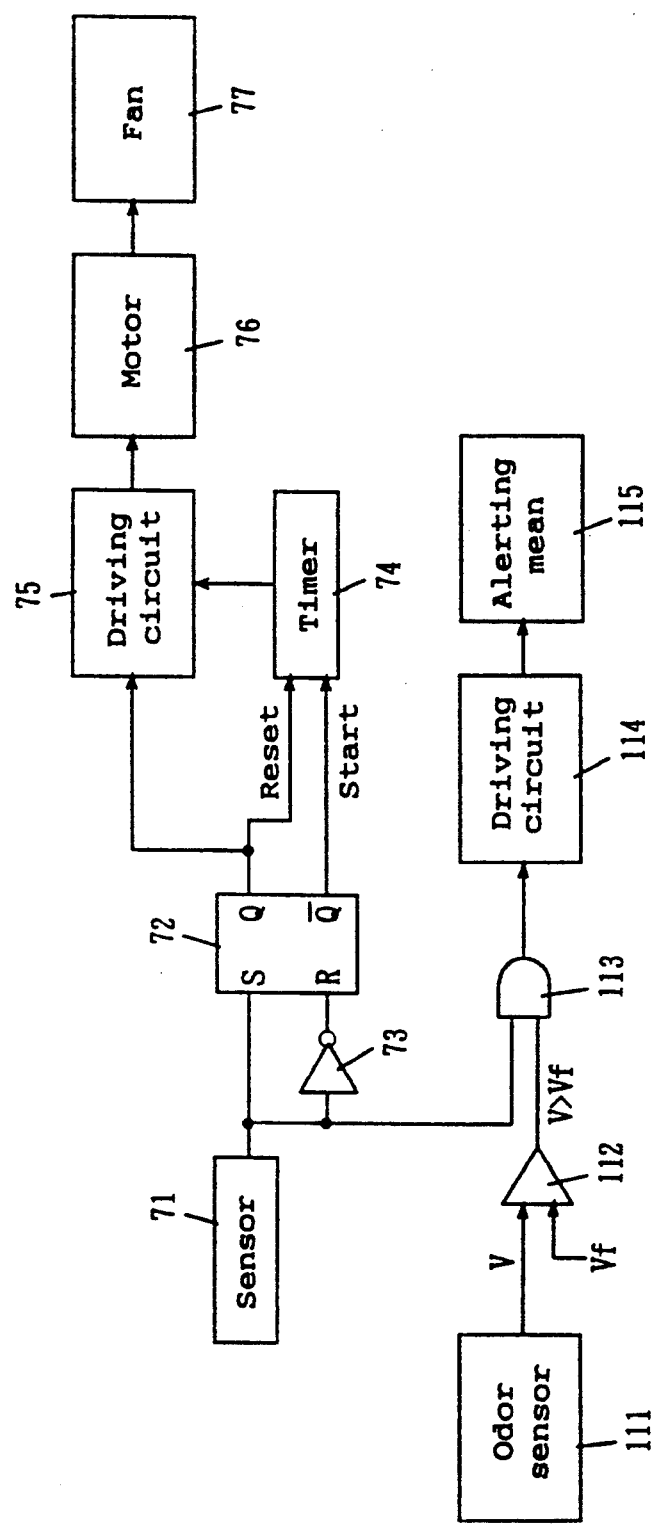
FIG. 16 is a block diagram showing still another electrical system for the deodorizing apparatus according to the invention.

FIG. 16 is a block diagram showing the electrical system used in a still another deodorizing apparatus of the invention.

This apparatus, like the apparatus shown in FIG. 15, comprises a sensor 71 for detecting the user's sitting on the stool seat 34 and leaving from the seat 34, an RS flip-flop 72, an inverter 73, a timer 74, a driving circuit 75, a motor 76 and a fan 77. Therefore, the removal of malodorous components are affected by the series of events, namely starting of the fan 77 upon the user,s sitting on the stool seat 34, starting - of the timer 74 upon the user,s leaving from the stool seat 34, and the continued rotation of the fan 77.

Disposed close to the exhaust port of the deodorizing apparatus is an odor sensor 111 which senses the concentration of malodorous components to generate information on the residual life of the activated carbon honeycombs. Thus, a comparator 112 compares the detection value V of this odor sensor 111 with a reference value Vf set in a setting circuit. The reference value Vf can be associated with an organoleptically detectable concentration of malodorous components.

When the detection value V exceeds the reference value Vf ($V > Vf$), an output signal "1" is applied to an AND circuit 113. As said sensor 71 detects the user's sitting on the stool seat, a detection signal "1" is also applied to the AND circuit 113. Therefore, when the fan 77 is rotating in response to the detection signal from the sensor 71 and $V > Vf$, the AND circuit 113 turns the driving circuit 114 ON so that the alerting means 115 informs the user that the useful life of the activated carbon honeycombs has run out.

On the other hand, even if said sensor 71 detects the user's sitting on the stool seat and the detection signal for the AND circuit 113 is "1", the signal from the comparator fed to the AND circuit 113 becomes "0" when the detection value V of the odor sensor 111 does not exceed the reference value Vf. Therefore, the driving circuit 114 becomes OFF so that the alerting means 115 is not actuated.

In this apparatus, the odor sensor 111 detects the concentration of a malodorous substance in the gas after deodorization by the rotating fan 77 and actuates the alerting means 115 in the event that the sensor detection value V is higher than the reference value Vf, without resort to information on the operating time and rpm of the motor 76. Therefore, the inactivation of the activated carbon honeycombs can be accurately ascertained.

In the apparatus shown in FIG. 3, it is possible to inform the useful life of the honeycombs. Thus, an RPM detector 101, a counter 102, a comparator 103, a driving circuit 104 and an alerting means 105, which are shown in FIG. 15, may be associated with a motor 9 of the apparatus shown in FIG. 3. Furthermore, the apparatus shown in FIG. 3 may comprises in combination with an odor sensor 111, a comparator 112, an AND circuit 113, a driving circuit 114 and an alerting means 115 which are designated in FIG. 16. Namely the output signal from the odor sensor 111 shown in FIG. 3 is applied to the AND circuit 113 shown in FIG. 16.

The deodorizing apparatus is formed with a gas inlet and a gas outlet preferably in positions of a casing which differ from each other in the direction of flow of the gas. Since the direction of suction and that of discharge are different in such an apparatus, disposition of the deodorizing apparatus on the wall of a room or at a corner of the room does not interfere with the smooth suction and discharge of the gas. Therefore, there is no decrease in deodorizing efficiency and the space available for deodorizing apparatus can be efficiently utilized.

Figure 17:
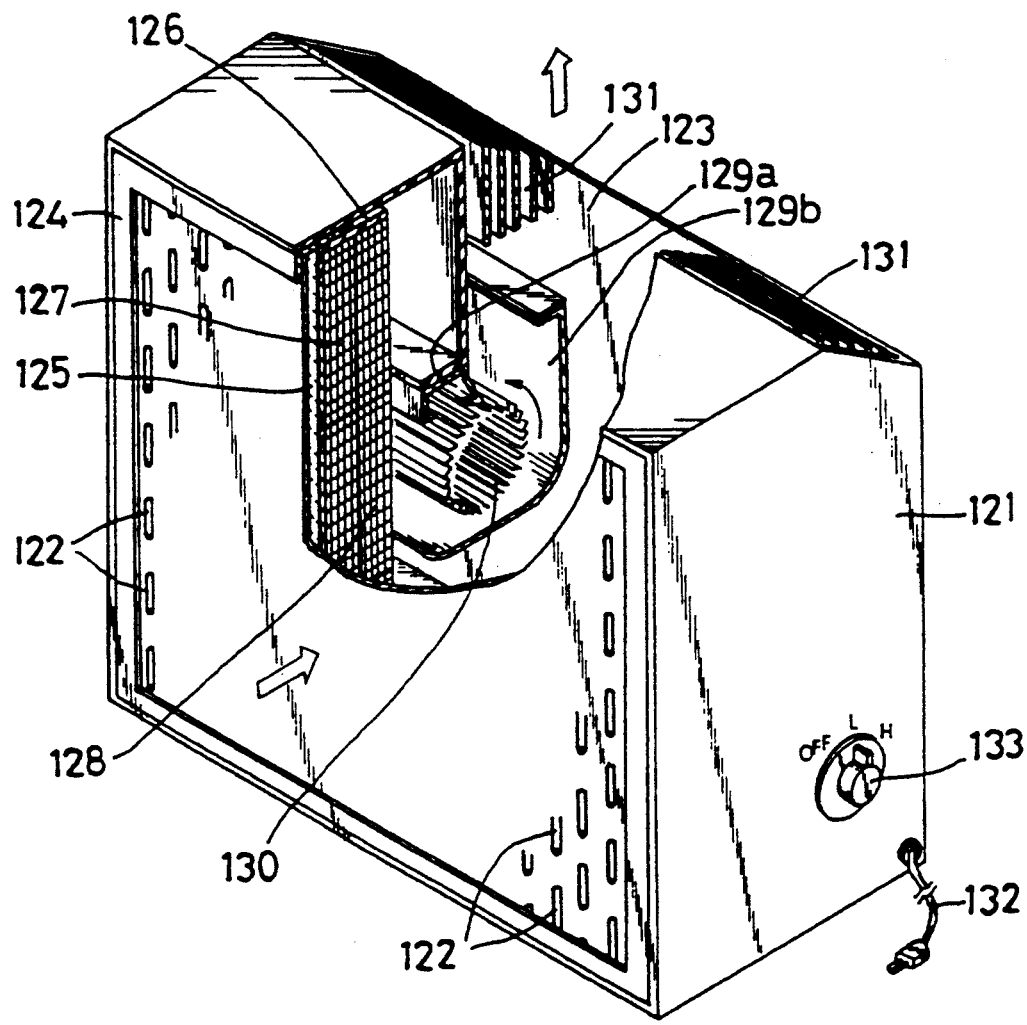
FIG. 17 is a schematic sectional perspective view showing a further embodiment of the invention.
Figure 18:
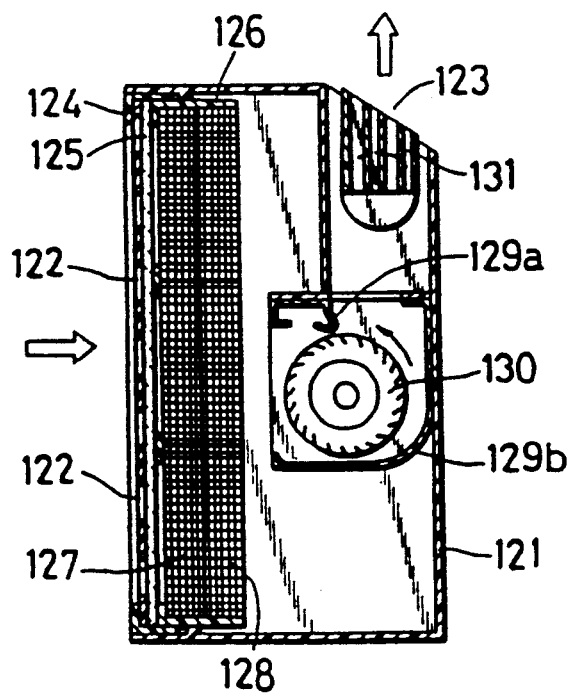
FIG. 18 is a sectional view of the apparatus shown in FIG. 17.

FIG. 17 is a schematic sectional perspective view showing a still another embodiment of the invention, and FIG. 18 is a sectional view of the apparatus illustrated in FIG. 17. This embodiment is what may be called a self-standing deodorizing apparatus, which can be installed on the floor of a room or on a base.

A casing 121 of this deodorizing apparatus is formed with gas inlet means 122 at the front side thereof and gas outlet means 123 at the inclined top side thereof. The gas inlet means 122 is provided with a dismountable charge filter 125 which is secured to a frame 124.

As the static charge filter 125, there can be employed a nonwoven fabric made of a fiber having a high polarization rate for enhanced particle trapping efficiency, such as a polypropylene or other electret fiber subjected to permanent charging treatment and having a permanent polarization [Filteret TM, Sumitomo 3M Ltd., Japan]. The weight of such a charge filter can be freely selected within a range that does not cause a large pressure loss, for example about 50 to 500 g/m² and preferably about 100 to 300 g/m².

Dismountably disposed internally of said charge filter 125 are an iodine-supporting activated carbon honeycomb 127 and an acid-supporting activated carbon honeycomb 128, both of which are secured to a grating-like frame 126.

Transversely formed within said casing 121 are guide members 129a and 129b defining a gas passageway extending from the gas outlet means 123. Interposed between said guide members 129a, 129b is a cross-flow fan 130 or a sirocco fan for withdrawing the gas from the gas inlet 122 via the gas outlet 123. The fan 130 is driven for rotation by a motor (not shown) as a driving means. Moreover, for controlling the direction of gas discharge, a control means 131 consisting of a plurality of plate-like fins is rotatably disposed at the gas outlet 123.

There is also disposed a speed controller 133 for controlling the rotational speed of the cross-flow fan 130 on one side of the casing 121. This controller 133 is connected to a power source via a cord 132.

With the deodorizing apparatus illustrated in FIGS. 17 and 18, the rotation of the fan 130 results in the elimination of dust from the material gas to be treated and in the deodorization of the gas. Since the direction of inflow is not parallel to the direction of outflow, the suction and discharge of gas take place efficiently even when the apparatus is installed on the wall of a room or at a corner of the room. Thus, the deodorizing efficiency is not decreased and the space available for deodorizing apparatus can be efficiently utilized.

Figure 19:
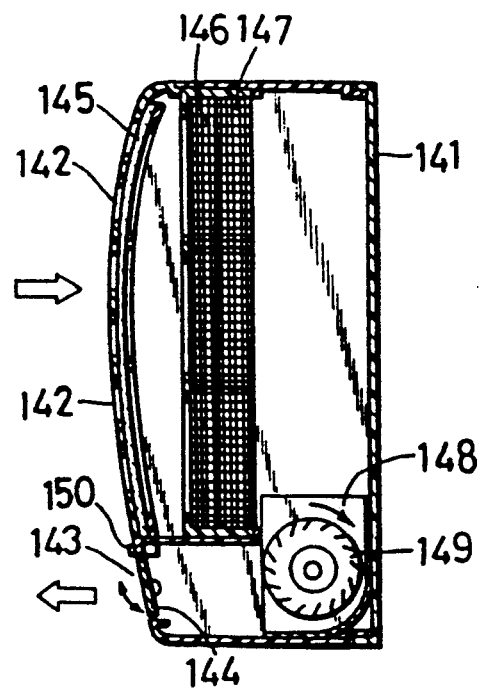
FIG. 19 is schematic sectional view showing still another embodiment of the invention.

FIG. 19 is a schematic sectional view showing a still another embodiment of the invention. This embodiment is a wall-type deodorizing apparatus for interior use.

The front of this deodorizing apparatus 141 comprises an upper part having a plurality of slits serving as gas inlet means 142 and a lower part having gas outlet means 143 which is opened and closed by a louver 144. Dismountably disposed internally of the gas inlet means 142 is a static charge filter 145 which is secured to a grate-like frame. Disposed further inwardly of the charge filter 145 are an iodine-supporting activated carbon honeycomb 146 and an acid-supporting activated carbon honeycomb 147, both of which are secured to a frame.

Disposed in said casing 141 at its lower position is a guide means 148 constituting a gas passageway, which extends from the gas outlet means 143, as well as a cross-flow fan 149.

The casing 141 is provided with a lamp 150 for indicating the operational status of the fan or of a timer controlling the operation time of the fan. The operation of the fan 149 and the timer setting can be remote controlled with a remotely controller and the louver 144 can be driven in timed relation with the operation of the fan 149. The angle of the louver 144 can be adjusted with said remote controller.

The deodorizing apparatus shown in FIG. 19, like the deodorizing apparatus shown in FIGS. 17 and 18, is capable of eliminating dust from the gas introduced into the apparatus and malodorous components from the gas in order to deodorize it. Moreover, since the directions of inflow and outflow are forward, the gas suction and discharge take place smoothly without loss of deodorizing efficiency even if the apparatus is installed in a high position, on the wall, for instance.

In the interior deodorizing apparatuses shown in FIGS. 17 through 19, the static charge filter may be replaceably interposed between, and supported by, a frame and the iodine-supporting activated carbon honeycomb, without being integrally secured to the frame. Moreover, the iodine-supporting activated carbon honeycomb and the acid-supporting activated carbon honeycomb may each be disposed in a suitable position in such a manner that they can be replaced with fresh ones from the front side, bottom side or the lateral side of the apparatus.

The flow rate of the gas to be treated with respect to the static charge filter, iodine-supporting activated carbon honeycomb and acid-supporting activated carbon honeycomb can be appropriately selected and may for example be about 0.2 to 1.5 m/sec. and preferably about 0.3 to 1.0 m/sec. The frequency of ventilation can be selected according to the source concentration of malodorous gas components and is generally about 1 to 15 times/hr. and preferably about 4 to 8 times/hr.

The deodorizing apparatus of the present invention comprise at least a gas passageway extending from a gas inlet to a gas outlet and an iodine-supporting activated carbon honeycomb disposed in the gas passageway, but need not include the acid-supporting activated carbon honeycomb. Furthermore, the acid-supporting activated carbon honeycomb and the iodine-supporting activated carbon honeycomb may be disposed in the order mentioned from the gas inlet side to the gas outlet side. Moreover, inasmuch as the iodine-supporting activated carbon honeycomb is present in the gas passageway, the apparatus may further comprise, in combination with this honeycomb, a dust filter and/or an activated carbon honeycomb, with or without the use of an acid-supporting activated carbon honeycomb.

In order to insure an internal filtering space commensurate with the space to be treated, an appropriate portion of the casing constituting the gas passageway, for example the gas inlet portion thereof, may be formed in the manner of a bellows.

The deodorizing apparatus of the invention need not comprise a fan when the gas to be treated may flow into the gas passageway without application of any suction but for a smooth passage of malodorous gases, the apparatus preferably has a fan. This fan preferably comprises a rotatable fan and a driving means which is energized by an AC or DC source to drive the fan. The fan need not be installed within the gas passageway but may be located externally of the casing, e.g. adjacent the gas outlet. In the case of a comparatively small apparatus, the fan is generally installed in its gas passageway. When the fan is installed in the gas passageway, its position is not so critical but can be an appropriate position with respect to the honeycomb and dust filter. For example, in the apparatus illustrated in FIG. 1, the fan may be installed either upstream or downstream of the iodine-supporting activated carbon honeycomb and acid-supporting activated carbon honeycomb or between the two honeycombs. To prevent fouling and corrosion of the fan, the fan is preferably disposed downstream of these honeycombs or near the downstream end of the gas passageway as mentioned hereinbefore.

Furthermore, the toilet deodorizing apparatus can be installed in an appropriate position according to the type of toilet, for instance. For example, the deodorizing apparatus may be mounted on a base formed in the seat box 36 shown in FIG. 5. Moreover, as mentioned hereinbefore, the gas inlet portion of the apparatus may be secured to the bottom side of a toilet seat, which is usually formed in a curved sectional shape, by taking advantage of the free space formed by projections 34a between the toilet bowl 33 and seat 34. Moreover, the deodorizing apparatus may be provided in the form of a complete toilet including said deodorizing system in a suitable position, for example on a receptor means. In the case of a Japanese-style toilet, the deodorizing apparatus may be mounted on the front part of the toilet bowl and the automatic switch or sensor is disposed at the side of the toilet bowl in the base region.

The damper mentioned above is not essential. The damper, if used, may be disposed on the gas outlet side of the apparatus or on the gas inlet and outlet sides. Furthermore, in the deodorizing apparatuses illustrated in FIGS. 4 to 9 and 11 to 14, a dust filter may be installed at the gas inlet side of the casing.

Moreover, in order to prevent entry of splashes through the gas inlet during defecation, urination or flushing, there may be provided a protective meshboard or plate structure extending from the casing just externally of the gas inlet.

The power source for driving the fan may be a direct current source or an alternating current source. As the DC power supply, any of dry batteries, rechargeable storage batteries, solar batteries, etc. can be employed. Particularly for use in a small deodorizing space, for example within a refrigerator, shoe box, closet, toilet, car, cupboard, carrier case or box for a pet, plant or fruit, the use of batteries is preferred. When a battery is used as the power supply, it is advantageous to correlate the useful life of the battery with the life of the honeycomb(s). In such cases, the type of dry battery can be selected according to the size of the space to be deodorized as well as the kinds and concentrations of malodorous components, while the saturation adsorbent capacity can be adjusted by controlling the number of cells and thickness of the honeycomb(s) such as iodine-supporting activated carbon honeycomb and the acid-supporting activated carbon honeycomb, the platinum group element-supporting activated carbon honeycomb and the bromine-supporting activated carbon honeycomb.

Regarding the apparatus for deodorizing such a small space where a power supply is not available, it preferably comprises a casing extending from a gas inlet to a gas outlet and defining a gas passageway therebetween, an activated carbon honeycomb, a fan means for ventilating a material gas in the direction from the gas inlet to the gas outlet and a battery for said fan means, with the gas inlet and outlet being formed in such a manner that the direction of suction is not parallel to the direction of discharge.

Figure 20:
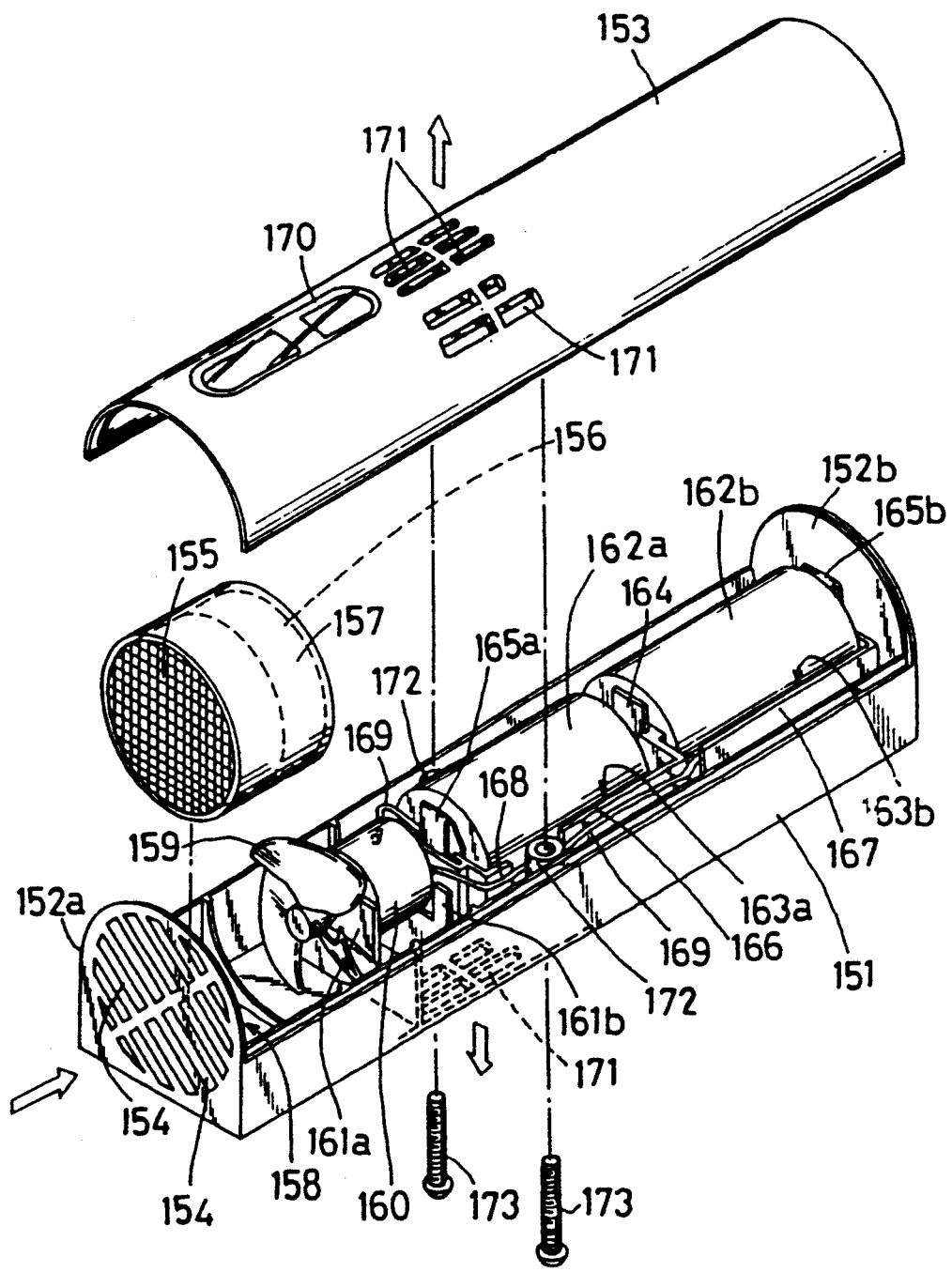
FIG. 20 is a disassembled perspective view showing another embodiment of the invention.

FIG. 20 is a disassembled perspective view showing a still another embodiment of the invention. This embodiment is an apparatus suitable for the deodorization of a small space in which a power supply is not available.

Thus, the casing of this apparatus comprises a split-cylindrical casing body 151 which is open at top and formed with a pair of upright walls 152a, 152b at corresponding ends thereof and a curved-section lid (cover) member 153 complementary with and adapted to close the open top of said casing body 151. The bottom of the casing body 151 is flattened for installed stability. One of the upright walls 152a of the casing body 151 is formed with slits to constitute a gas inlet means 154.

The gas inlet 154 side of the casing body 151 is formed with a mounting base 158 adapted to replaceably accept an annular supporting member 157 for supporting the iodine-supporting activated carbon honeycomb 155 and acid-supporting activated carbon honeycomb 156. Adjacent this mounting base 158, the casing body 151 is further provided with a small motor 160 for driving a fan 159. The bearing for rotatably supporting the drive shaft of said motor 160 is supported by a first holding wall 161a, while a bearing cover for covering the other bearing of said small motor 160 is supported by a second holding wall 161b.

Furthermore, the casing body 151 is formed with mounting means 163a, 163b for accepting a plurality of electric cells 162a, 162b for driving said motor 160. These mounting members 163a, 163b are constituted by walls 166, 167 having conductive metal plates 164, 165a, 165b adapted to resiliently contact the positive and negative electrodes of said cells 162a, 162b. In addition, the motor 160 is electrically connected to said conductive metal plates 164, 165a, 165b by leads 168 and 169.

The lid member 153 is formed with a sight hole 170 through which the operational status of the fan 159 can be ascertained. Moreover, the casing body 151 and lid member 153 are provided with a slit-type gas outlet means 171 for the gas drawn from said gas inlet means 154 and treated by said iodine-supporting activated carbon honeycomb 155 and acid-supporting activated carbon honeycomb 156.

Because of the above construction, the direction of gas suction from said gas inlet 154 is different from the direction of gas discharge from said gas outlet 171.

The casing body 151 and the lid member 153 are joined by setscrews 173 extending through threaded members 172 erected in opposed relation.

In this deodorizing apparatus, a gas drawn by the fan means comprising a motor 160 and a fan 159 from the gas inlet means 154 is deodorized by the iodine-supporting activated carbon honeycomb 155 and acid-supporting activated carbon honeycomb 156 and, then, discharged from the gas outlet means 171 of said casing body 151 and lid member 153.

Moreover, since the fan 159 operates on electric cells 162a, 162b, the deodorizing apparatus can be installed in a small space where no power supply is available, for example within a refrigerator, a shoe box or the like. Furthermore, since the gas is drawn and discharged by force within said space, the efficiency of deodorization by the iodine-supporting activated carbon honeycomb 155 and acid-supporting activated carbon honeycomb 156 is very high. Moreover, since the direction of suction is different from the direction of discharge, the suction and discharge of gas are not obstructed, regardless of the installation position within the space, with the result that the deodorizing efficiency is not sacrificed. Particularly because the peripheral surface of the lid member 153, where the gas discharge means 171 is located, is curved in section, it does not happen that the gas outlet means 171 is obstructed by adjacent articles.

When the life of cells 162a, 162b has run out, the stoppage of the fan 159 can be ascertained through said sight hole 170. Therefore, the time to replace the cells 162a, 162b can be easily detected.

Moreover, since the lid member 153 is separable from the casing body 151, replacement of the respective honeycombs 155, 156 and cells 162a, 162b is facilitated.

Figure 21:
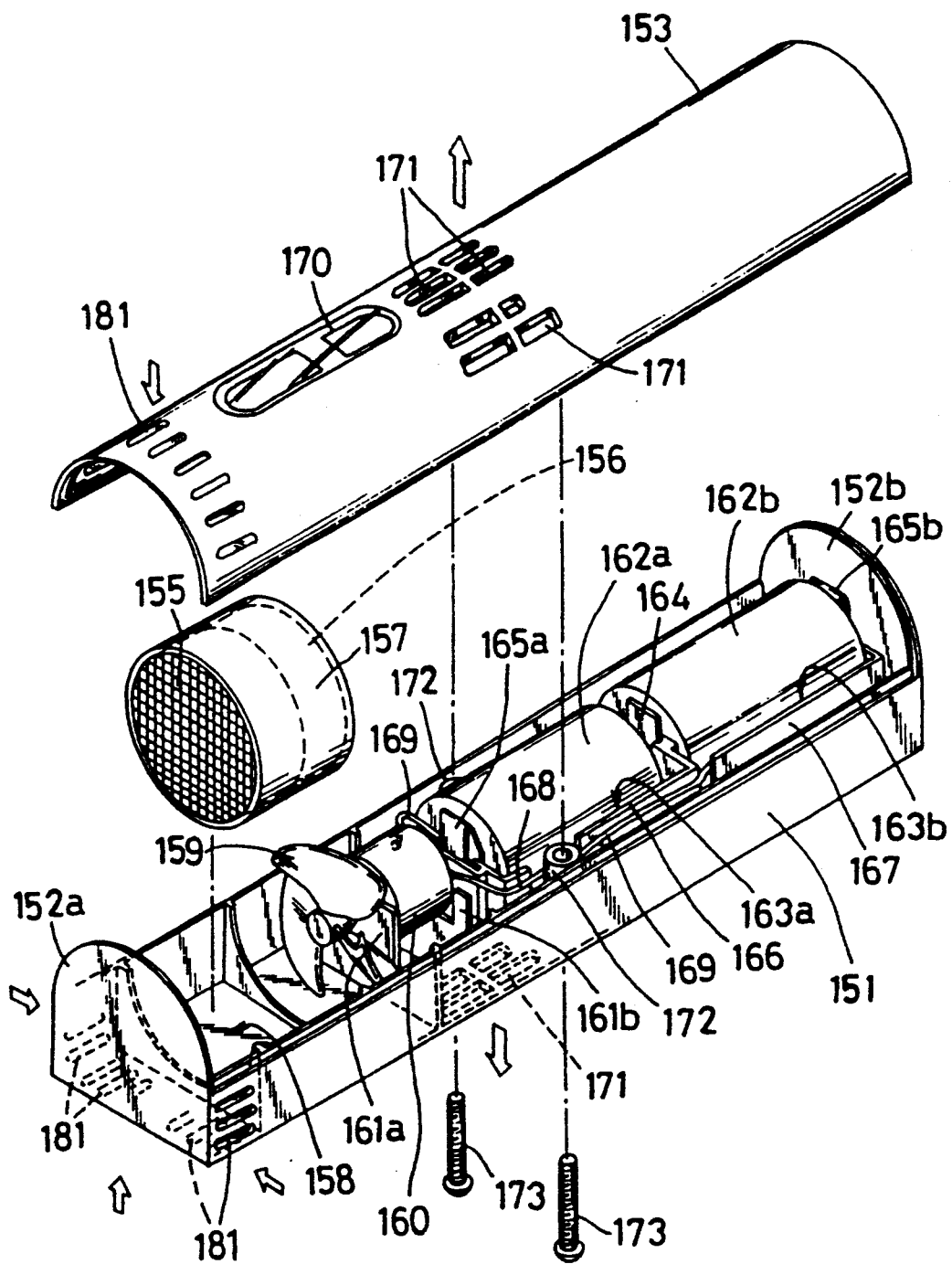
FIG. 21 is a schematic disassembled perspective view showing a further embodiment of the invention.

The gas inlet means and outlet means can be provided in optional positions of the apparatus. FIG. 21 is a schematic disassembled perspective view showing a further embodiment of the invention. It should be understood that the parts like those shown in FIG. 20 are indicated by the like numerals.

This embodiment is similar to the deodorizing apparatus illustrated in FIG. 19 except that a slit-type gas inlet means is disposed in the peripheral wall at one end of the casing body 151 and lid member 153.

Since this apparatus is formed with gas inlet means 181 and gas outlet means 171 in said peripheral wall, it does not happen even when the apparatus is set in a confined space such as a refrigerator compartment together with other articles that these gas inlet means 181 and outlet means 171 are obstructed by such articles. Therefore, the space to be deodorized can be thoroughly treated.

In the apparatuses illustrated in FIGS. 20 and 21, it is sufficient that at least one of the casing body and lid member be formed with gas outlet means and the gas discharge slits in the bottom of the casing body are not essential. Moreover, the aforesaid setscrews are not essential, either. Thus, the lid member may be connected to the casing body by means of a hinge or the like.

Figure 22:
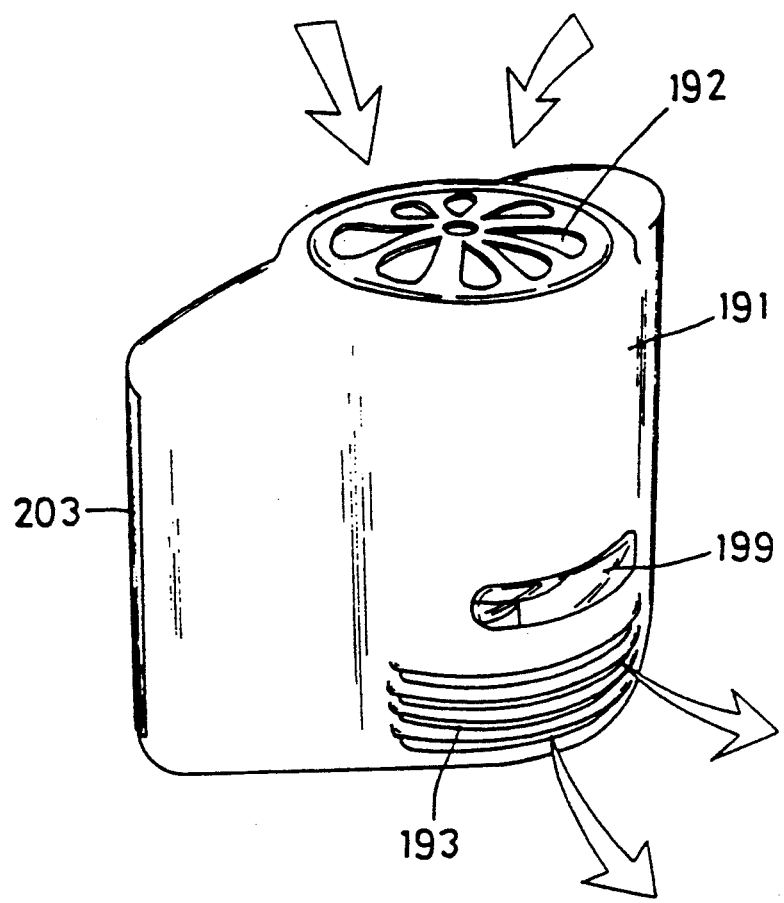
FIG. 22 is a schematic perspective view showing a further embodiment of the invention.
Figure 23:
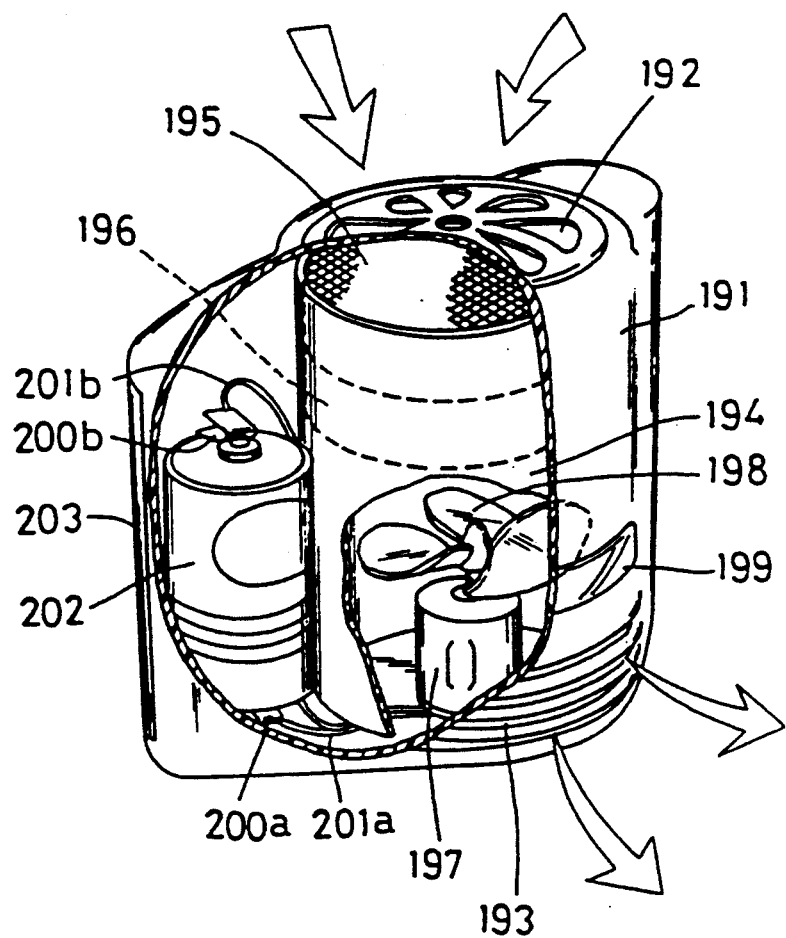
FIG. 23 is a partially exploded perspective view of the apparatus shown in FIG. 22.

FIG. 22 is a schematic perspective view showing still another embodiment of the invention and FIG. 23 is a partially exploded perspective view of the apparatus illustrated in FIG. 22.

The apparatus according to this embodiment comprises a gas inlet means 192 at the top of its casing 191 and a gas outlet means 193 in the lateral wall of a lower part thereof. The top end face of the casing 191 which corresponds to the gas inlet means 192 is somewhat bulged out, while its lateral walls corresponding to said gas outlet means 193 are curved outwardly. Disposed within the casing 191 is a cylinder 194 forming a gas passageway extending from the gas inlet means 192 to the gas outlet means 193. The lower lateral side of the cylinder 194 is formed with an opening (not shown) communicating with the gas outlet means 193.

Successively disposed in an upper portion of the cylinder 194 are an iodine-supporting activated carbon honeycomb 195 and an acid-supporting activated carbon honeycomb 196. A fan 198 which is driven by a small motor 197 is disposed in a lower portion of the cylinder 194. With the rotation of the fan 198, the gas to be treated is drawn from the gas inlet means 192 into the gas passageway and deodorized by the iodine-supporting activated carbon honeycomb 195 and acid-supporting activated carbon honeycomb 196, with the treated gas being discharged from the gas outlet means 193. The side wall of the casing 191 is formed with a sight hole or window 199 through which the rotational status of the fan 198 can be ascertained.

Further disposed within said casing 191 is a pair of conductive metal plates 200a, 200b to be engaged by a dry battery 202. These conductive metal plates 200a, 200b are connected to the motor 197 via leads 201a, 201b. Each of said conductive metal plates 200a and 200b is bent into resilient contact with the positive and negative electrodes of the dry battery 202.

The lateral side of the casing 191 is provided with a dismountable cover 203. This cover 203 is utilized for change of the battery 202 and withdrawal of the cylinder 194 carrying the activated carbon honeycombs 195, 196. Since the opening formed in the lower lateral wall of the cylinder 194 is larger than said motor 197 and fan 198, withdrawal of the cylinder 194 from the casing 191 or installation thereof into the casing 191 is not impeded.

In this deodorizing apparatus, like the apparatus illustrated in FIGS. 20 and 21, the gas inlet means 192 and gas outlet means 193 of casing 191 which are disposed in different orientations are not obstructed by extraneous articles. Therefore, malodorous gaseous components can be smoothly and effectively removed from a space where no power supply is available, for example within a refrigerator, shoe box or carrier case for a pet. Furthermore, by checking for the rotational status of the fan 198 through said sight hole 199, the life and time of replacement of the battery 202 can be accurately ascertained. In addition, replacement of the battery 202 and the cylinder 194 can be easily carried out by way of the cover 203.

Figure 24:
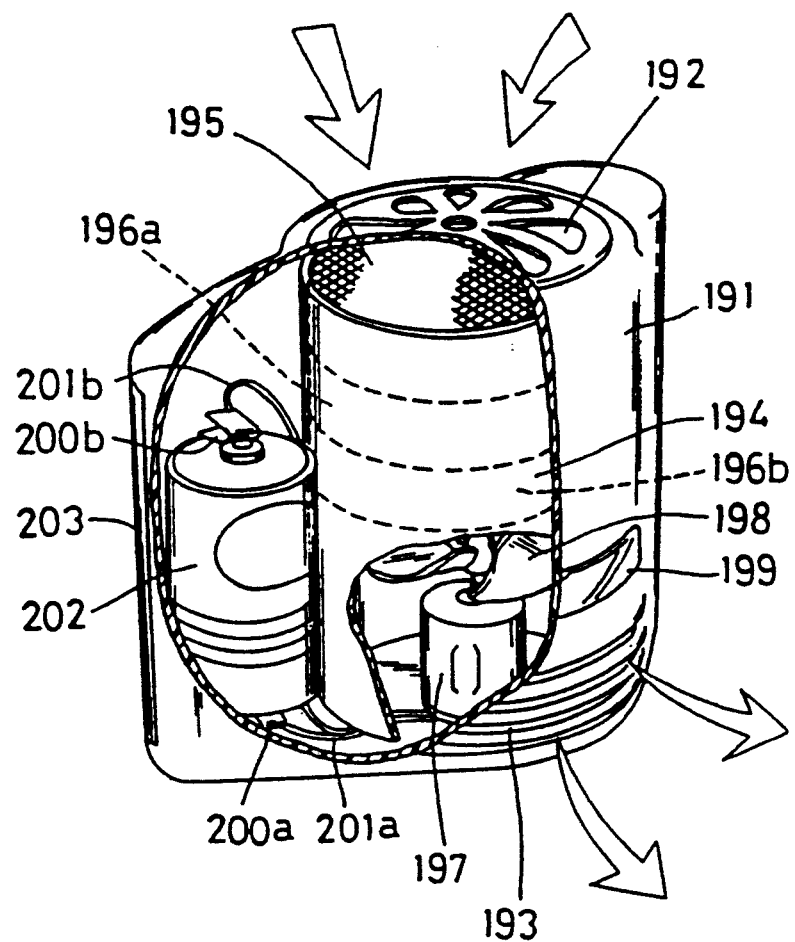
FIG. 24 is a partially exploded perspective view showing a further embodiment of the invention.

FIG. 24 is a partially exploded perspective view showing a further embodiment of the invention. This apparatus is useful to maintain freshness of a plant, fruit, flowers, vegetables, apples, bananas and so on in a closed space (e.g. a refrigerator, a carrier case or a box).

In this embodiment, the apparatus is provided with the same elements of the apparatus shown in FIGS. 22 and 23 except that activated carbon honeycombs comprise an iodine-supporting activated carbon honeycomb 195, an acid-supporting activated carbon honeycomb 196a and a platinum group element- or bromine-supporting activated carbon honeycomb 196b disposed within the cylinder 194, in that order, from the inlet means 192 to outlet means 193 of the casing 191.

In this deodorizing apparatus, malodorous gaseous components can be smoothly and effectively removed by activated carbon honeycombs 195,196a,196b in a closed space where no power supply is available. Furthermore, since the platinum group element- or bromine-supporting activated carbon honeycomb 196b is disposed in the gas passageway, lower unsaturated hydrocarbons such as ethylene produced from a plant or a fruit can be efficiently eliminated to maintain the freshness of the plants and fruits in the closed space. In this embodiment, the platinum group element- or bromine-supporting honeycomb can be disposed in an appropriate position in the gas passageway such as upstream or downstream of the iodine-supporting honeycomb or the acid-supporting honeycomb. The acid-supporting activated carbon honeycomb is not essential.

In the apparatuses shown in FIGS. 20 through 24, the casing need only be such that the activated carbon honeycombs or cylinder and the battery can be mounted therein and, for example, that the regions of the casing which correspond to the installation positions of the activated carbon honeycombs or cylinder and the battery can be opened and closed by a cover means hinged to the casing body.

The gas outlet means need only be such that it exists in the peripheral wall of the casing downstream of the fan means comprising a fan and a motor but the gas outlet means is preferably formed in the peripheral wall of the casing which lies downstream of the fan of said fan means. The gas passageway may be provided with a guide member for guiding the gas to the gas outlet means in a position downstream of the fan. In this case, the gas treated by the activated carbon honeycomb can be smoothly discharged from the gas outlet means.

The sight hole formed in the casing can be located in any appropriate position where the rotational status of the fan can be ascertained. Moreover, in order that the rotational status of the fan may be more easily ascertained, the fan may be painted dissimilar shades for, e.g. fan blades, or for the face and reverse sides of the fan. Moreover, a static charge filter may be replaceably disposed at the gas inlet side of said casing.

In the deodorizing apparatuses illustrated in FIGS. 20 through 24, which utilize a battery as the energy source for the fan motor, it is difficult to increase the flow rate in relation to the battery life. While the number of cells in the activated carbon honeycomb can be selected in relation to the source voltage, there is an optimum range for the number of cells in the activated carbon honeycomb in a deodorizing apparatus with a low flow rate. By way of illustration, when the flow rate is as low as about 80 to 700 liters/hr, the desirable cell density in the activated carbon honeycomb may for example be about 10 to 500 cells/inch$^2$, preferably about 20 to 200 cells/inch$^2$, and more preferably about 25 to 125 cells/inch$^2$. When such an activated carbon honeycomb is used in an apparatus with a low flow rate, even if the number of cells is small and the area of contact with the material gas is small, malodorous gaseous components can be almost completely and smoothly eliminated in a single pass. Moreover, even if the malodorous gaseous components cannot be completely removed in a single pass, they can be eliminated in a short time period with high efficiency. This effect is an unexpected result in contrast to the general knowledge on honeycomb structural materials. From the view point of the honeycomb structural material, the number of cells and their contacting area is in general preferably larger. Therefore, this deodorizing apparatus is useful for the deodorization of closed spaces, for example within a refrigerator, shoe box, closet, cupboard, car, carrier case for plants or fruits or the like.

Furthermore, in order to insure an efficient use of the battery in the apparatuses illustrated in FIGS. 20 through 24, the casing may be provided, in an appropriate position, with a switch for turning the battery on and off. It is not necessary to use a plurality of batteries but only one battery is sufficient. The casing may also be provided with an alarm means for alerting the user to the exhaustion and time for replacement of the battery.

When a plurality of activated carbon honeycombs are employed, these plural honeycombs may be integrated beforehand or may be independently mounted in the gas passageway of the casing.

The gas inlet and outlet means can be disposed in optional positions of the casing with different orientations and within the range not interfering with gas suction and discharge, for example on the front and top, respectively, or the front and one side, respectively, of the casing. Preferably the gas inlet and outlet means are disposed on the same or adjoining surfaces of the casing. Furthermore, the gas inlet and outlet means may be formed in any desired positions that will not be obstructed by articles that may be present in the space to be treated, for example in a portion of the casing which is undulating in sectional configuration but allowing the gas to flow through.

The present invention can be applied to various deodorizing apparatus such as a dust bin deodorizing apparatus. The dust bin deodorizing apparatus usually comprises a box for accommodating garbage, a lid member covering the opening of said box, a gas passageway extending from a gas inlet means communicating with said box to a gas outlet means and an activated carbon honeycomb(s) disposed in said gas passageway.

Figure 25:
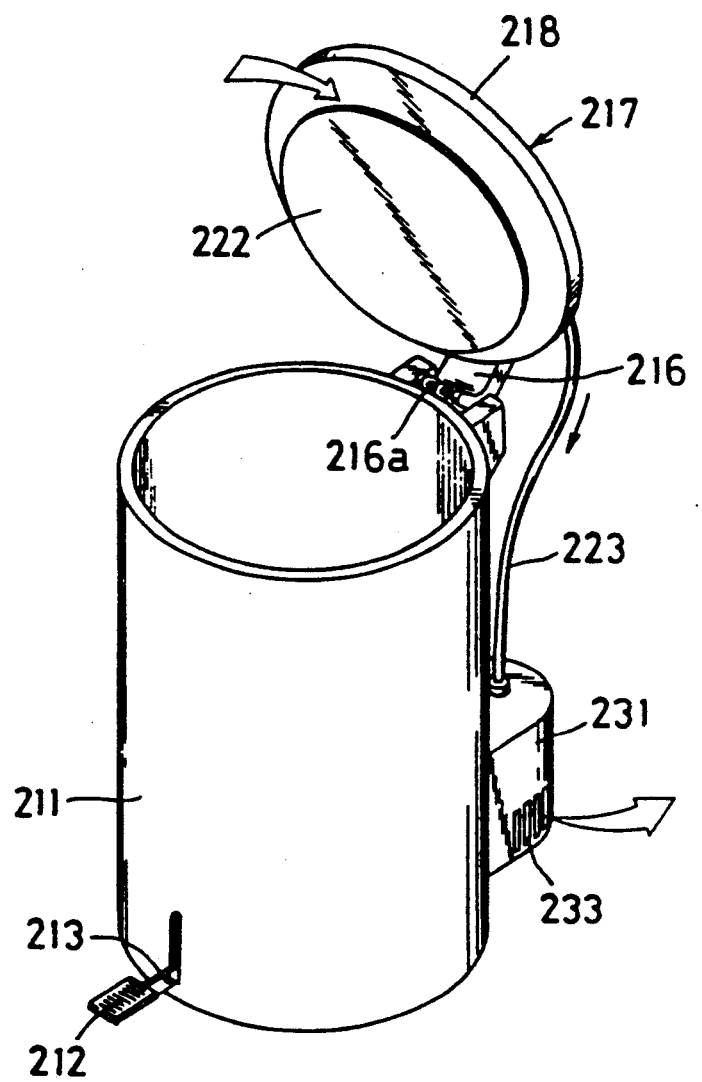
FIG. 25 is a schematic perspective view showing a dust bin deodorizing apparatus.
Figure 26:
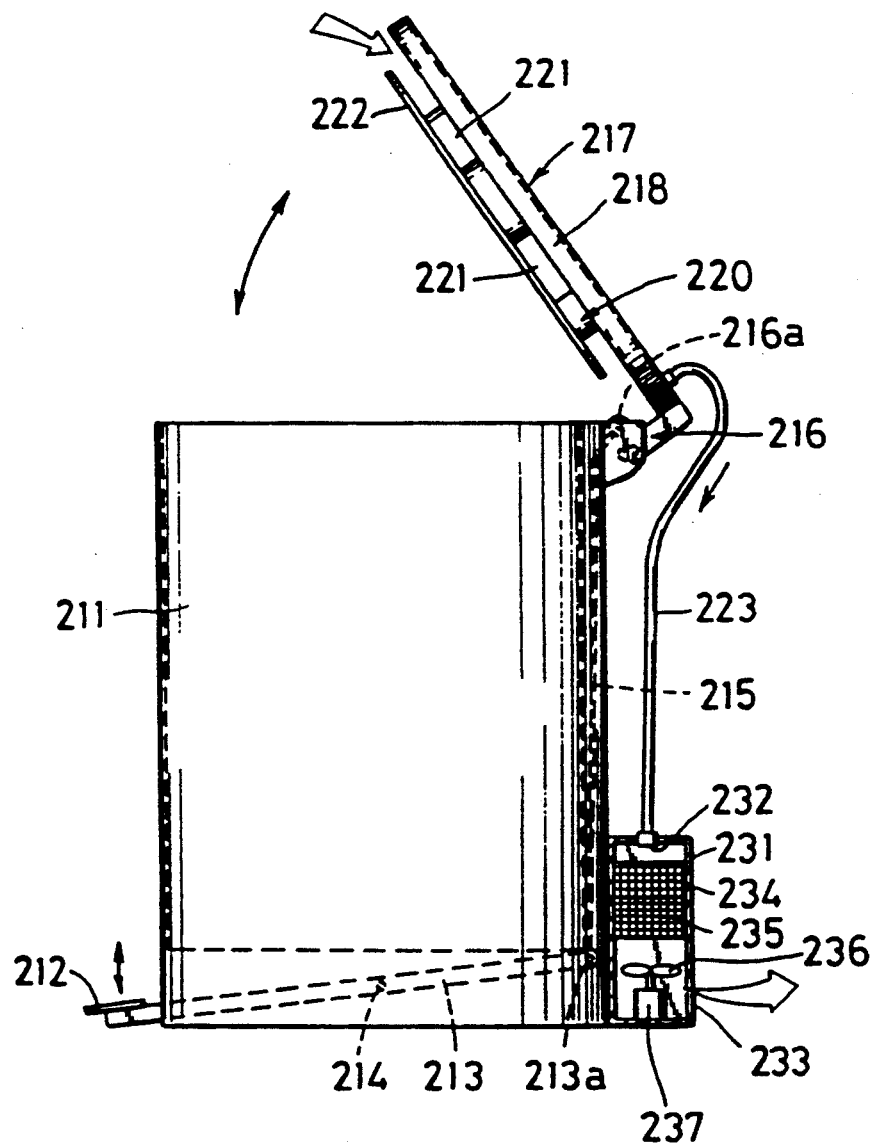
FIG. 26 is a schematic side-elevation view of the apparatus shown in FIG. 25.
Figure 27:
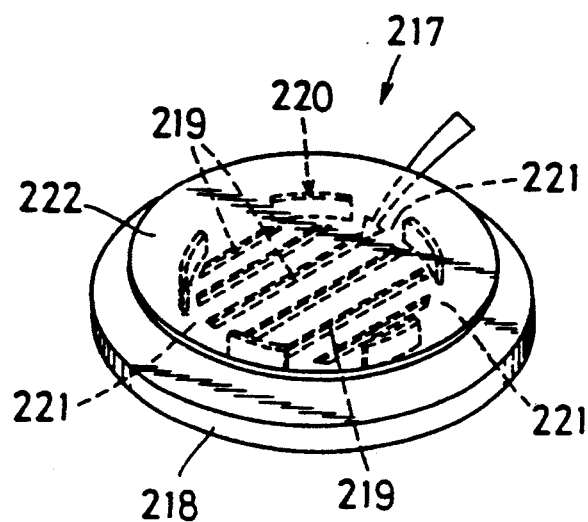
FIG. 27 is a sectional perspective view showing a lid member of the apparatus shown in FIG. 25.

FIG. 25 is a schematic perspective view showing a dust bin-deodorizing apparatus, FIG. 26 is a schematic side elevation view of the apparatus shown in FIG. 25, and FIG. 27 is a sectional perspective view showing a lid member of the apparatus shown in FIG. 25.

This deodorizing apparatus comprises a box 211, which is cylindrical in cross-section and constitutes the body of a dust bin, and a lid member 217 which is swingably connected to said box 211 by means of a hinge 216 and adapted to cover the open side of said box 211.

The box 211 is provided, in a lower position, with a pedal 212. Extending from this pedal 212 is a shaft 213 traversing a lower space of the box 211 and pivotally supported by a supporting member 214. Connected to a pivot 213$a$ formed at the other end of the shaft 213 is one end of a connecting rod 215 extending along the side wall of the box 211, with the other end of the connecting rod 215 being secured to a pin 216$a$ of the hinge 216. Thus, as the pedal 212 is depressed, the shaft 213 swings about the supporting member 214 to raise the connecting rod 215, whereby the lid member 217 is swung upwards about the hinge 216 to open the box 211.

The lid member 217 comprises a hollow lid body 218 adapted to cover the opening of the box 211, a plurality of slits 219 formed in the inner center of the lid body 218, and a shielding plate 222 attached to the lid body through a ring-shaped spacer means 220 arranged circumferentially on the inner surface of said lid body 218, the diameter of said shielding plate 222 being smaller than the diameter of the opening of the box 211. The ring-shaped spacer means 220 has a plurality of slits 221 communicating with the slits 219 of the lid body 218 at predetermined intervals.

The hollow part of the lid body 218 is communicably connected to a gas inlet means 232 of a casing 231 constituting a deodorizing unit by a flexible hose 223. Successively disposed within a gas passageway extending from the gas inlet means 232 to the gas outlet means 233 of said casing 231 are an iodine-supporting activated carbon honeycomb 234, an acid-supporting activated carbon honeycomb 235, a fan 236 and a motor 237 as in the apparatuses described hereinbefore. The motor 237 can be driven by a DC current, from a battery or the like, or an AC current.

In lieu of, or in addition to, said acid-supporting activated carbon honeycomb, a bromine-supporting activated carbon honeycomb and/or a platinum group element-supporting activated carbon honeycomb may be employed.

Furthermore, a switch (not shown) adapted to detect contact between said box 211 and lid body 218 is disposed in a suitable peripheral position of the lid body 218 and a timer (not shown) for driving the motor 237 for a predetermined time is actuated in response to a detection signal from said switch.

In this deodorizing system, as the pedal 212 is depressed to displace the lid body 217 and open the box 211, a garbage is put in the box 211 and the pedal 212 is released, the lid body 217 shuts off the opening of said box 211. In this connection, since the lid body 217 is provided with a shielding plate 222, the rubbish and dirty water are prevented from entering directly into the hollow cavity of the lid body 218. When a garbage contained in a vinyl bag, paper bag or the like is discarded, the slits 219 of the lid body 218 are similarly protected against occlusion. The opening of the box 211 is not hermetically closed by the lid body 217 but there is generally some clearance between the box 211 and the lid body 218.

As the aforesaid switch detects closure of the opening of the box 211 by the lid body 218, it produces a detection signal, and in response to this signal, the timer drives the motor 237 for a predetermined time. As the motor 237 is driven, the malodorous gas within the box 211 is drawn into the casing 231 of the deodorizing unit via the slits 221 of the ring-shaped spacer means 220, slits 219 of the lid member 218 and the hose 223 and is deodorized by the iodine-supporting activated carbon honeycomb 234 and acid-supporting activated carbon honeycomb 235. The odor-free clean gas is discharged from the gas outlet means 233 of the casing 231.

In the above dust bin-deodorizing apparatus, the hose is connected to one end of the lid body. However, the hose can be properly connected to a given position only if it may communicate with the hollow cavity of the lid body.

Figure 28:
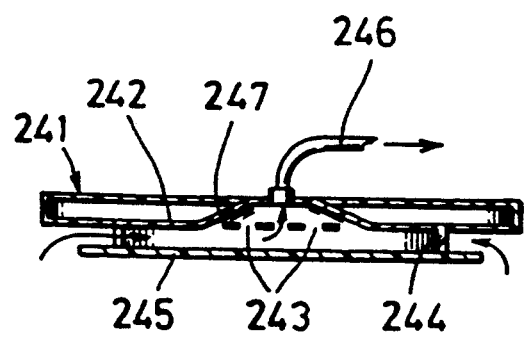
FIG. 28 is a sectional elevation view showing another lid member of the dust bin deodorizing apparatus.

FIG. 28 is a sectional view showing a different lid body for the dust bin-deodorizing apparatus. In this example, the hose 246 is connected to an approximate center of the lid body 242. Thus, the lid member 241 comprises a hollow lid body 242 having slits 243 formed internally, spacers 244 formed at predetermined intervals on the inner surface of the lid body, and a shielding plate 245 attached to the spacers.

Connected to an approximate center of the lid body 242 is a hose 246 communicating with the cavity of the hollow lid body 242. Disposed in the lid body 242 is a guide plate 247 for guiding the material gas in an inclined direction from the circumferential part of the slits 243 to the point of connection to said hose 246.

In the above dust bin-deodorizing apparatus, the configuration of the box and of the lid member is not limited and may for example be square or the like. Moreover, the box itself may be used as the dust bin or a case functioning as the dust bin may be removably installed in the box. In the latter arrangement, since the case containing rubbishes can be taken out from the box, it is not necessary to relocate the whole box for final disposal. Moreover, the mechanism for opening and closing the box with a pedal is not limited to the above-described structure but a variety of mechanical systems can be employed in a suitable combination. The spacers of the lid body and the shielding plate are not essential. Instead, narrow slits or holes for inhibiting the entry of splashes or the like may be formed in the lid body.

The deodorizing unit may be integrally attached to the box or incorporated in the box. When the deodorizing unit is attached to one side of the box, the unit and the hose may be covered with a cover means. Moreover, in the above deodorizing unit, a dust filter may be installed at the upstream side of the gas inlet means of the casing.

A small deodorizing unit may be interposed between the shielding plate and the lid body. In this case, the fan may be operated on a battery and the slits of the lid body are not necessary.

The means for opening and closing the lid member is not limited to said switch but a variety of sensors and switches, such as a piezoelectric sensor attached to the foot-pedal, the top surface of the box or the inner surface of the lid member or a contact sensor attached to one end of said connecting rod, for instance, can be utilized.

It may also be so arranged that the fan is driven continuously, without employing said sensor and switch.

Figure 29:
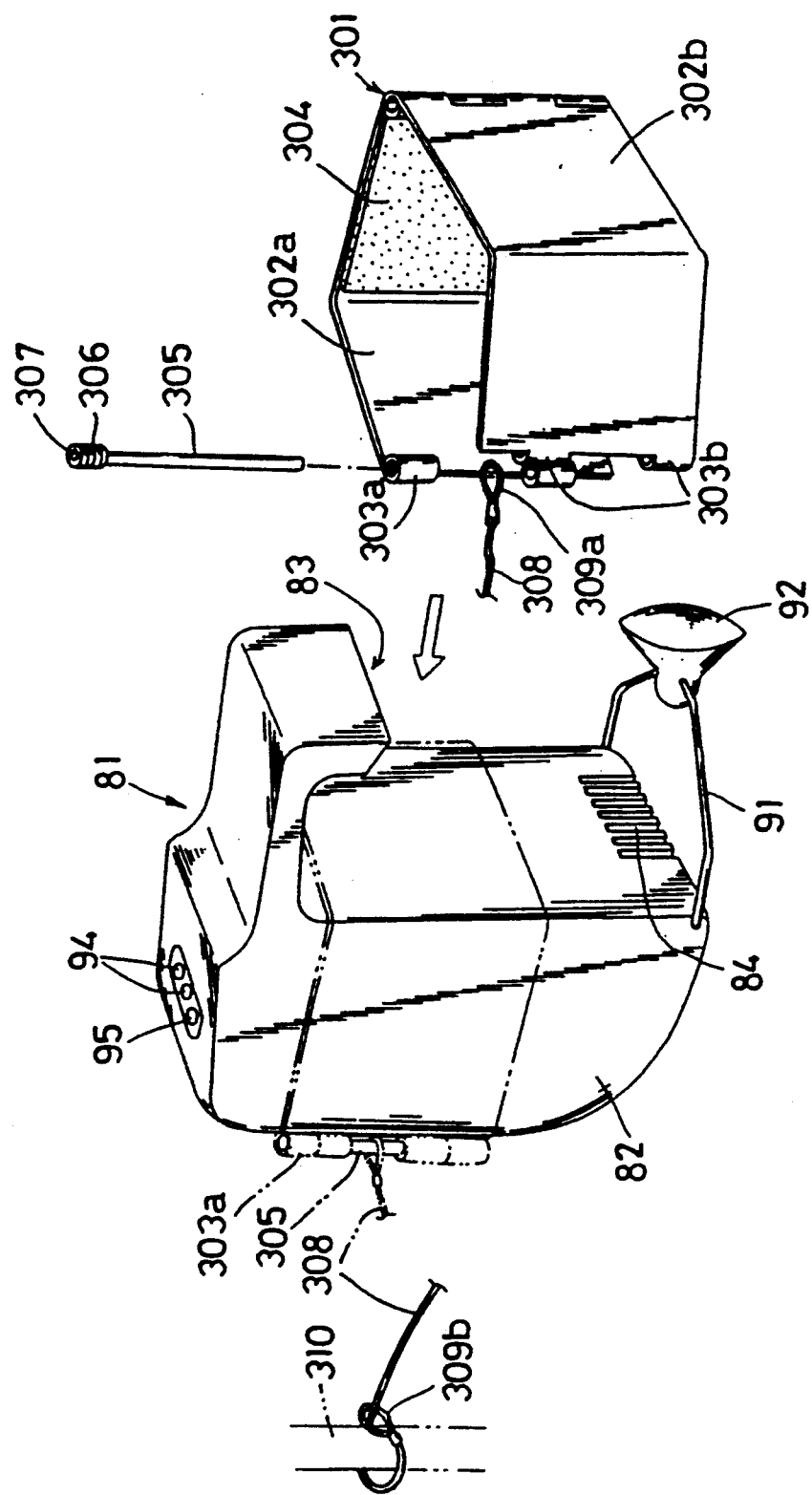
FIG. 29 is a disassembled perspective view showing a toilet deodorizing apparatus provided with an anti-theft device.

The deodorizing apparatus of the present invention may be equipped with an antitheft device. FIG. 29 is a disassembled perspective view showing the deodorizing apparatus provided with such an antitheft device. In this view, the like parts are designated by the like reference numerals used in FIG. 11.

The antitheft device comprises a couple of rigid tough bands 302a and 302b, which are made of, for example, a metal and are swingably connected to each other through a hinge 301, said bands 302a,302b being formed with hollow cylindrical members 303a,303b in staggered relation, and a pin 305 which can be inserted into the bores of said cylindrical members 303a,303b as aligned. The surface of one band 302a which is adjacent to the hinge 301 is rigidly secured to the inner side wall of the casing 82 of the deodorizing apparatus 81 by means of, say, an adhesive 304. The other band 302b is free to turn about the hinge 301.

One end of said pin 305 is formed with a screw 306 which is larger in diameter than a shaft portion of the pin 305. This screw 306 is engaged by a thread formed on the internal wall of the corresponding hollow cylindrical member 303a. In addition, the end face of said screw 306 is formed with a hexagonal hole 307 which is not conforming to the Japanese Industrial Standard (JIS).

This antitheft device is further equipped with a wire 308 which is formed with a ring 309a at one end and a ring 309b at the other end. The pin 305 is passed into one ring 309a, while the other ring 309b is available for securing the device undetachably to a stationary member such as a water pipe 310. Thus, with the wire 308 being hooked on, or wound round, the water pipe 310, one ring 309b is passed through the other ring 309a and the pin 305 is then passed into the ring 309a and the hollow cylindrical members 303a,303b. Then, using a special screwdriver compatible with the hexagonal hole 307, the screw 306 of the pin 305 is engaged with the thread of the hollow cylindrical member 303. In this arrangement, since the hexagonal hole 307 is not conforming to the JIS, the band 302b cannot be turned apart with any ordinary screwdriver. Therefore, theft of the deodorizing apparatus can be successfully prevented. Furthermore, since the bands 302a, 302b are positioned on the cartridge-mounting part of the casing, theft of the cartridge can also be prevented.

It should be understood that, in this embodiment, said bands can be any kinds of bands that fit to the contour of the casing of the deodorizing apparatus and cannot be detached from the apparatus.

Figure 30:
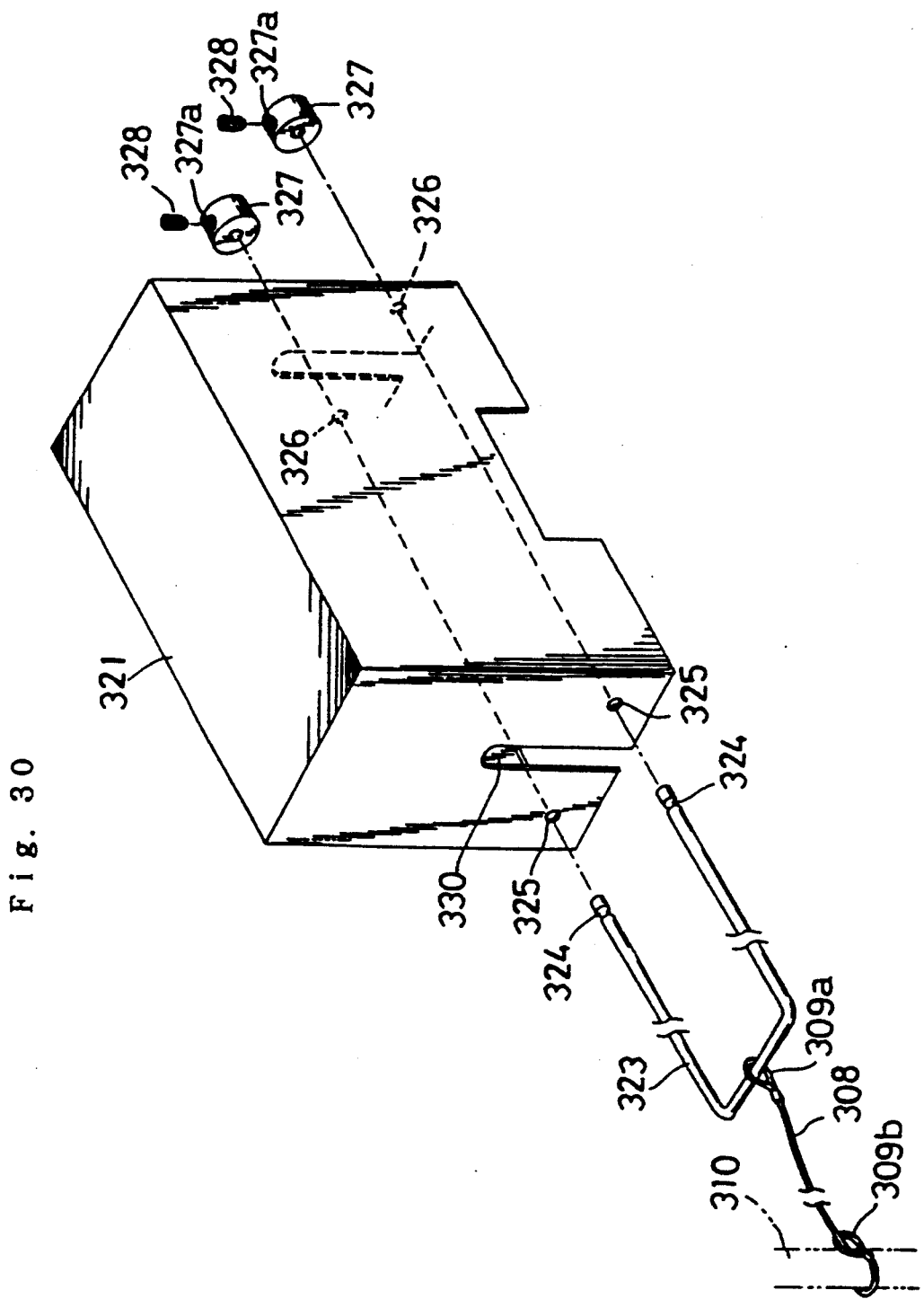
FIG. 30 is a schematic perspective view showing a battery powered antitheft device.
Figure 31:
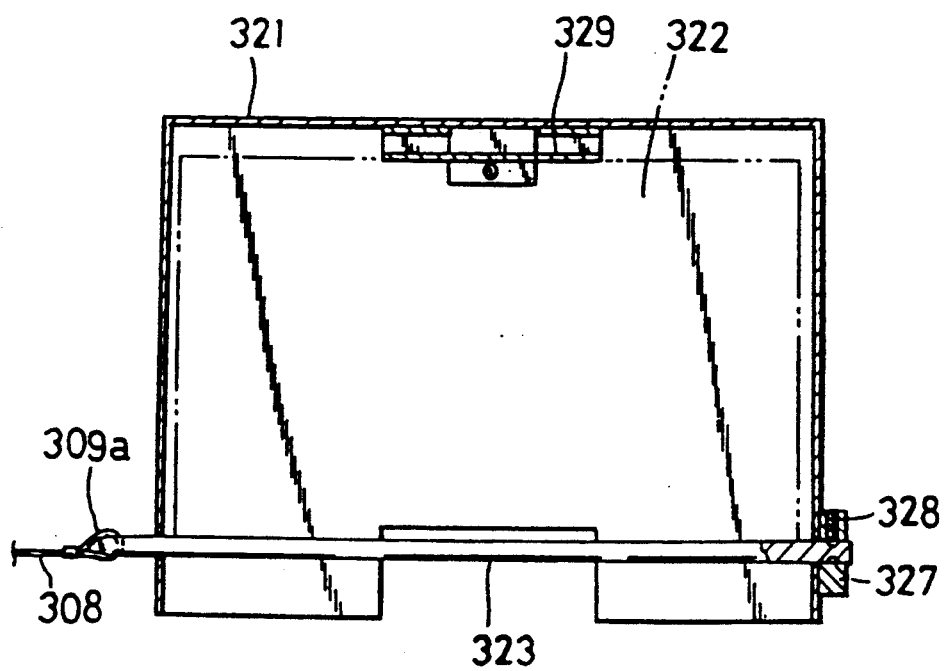
FIG. 31 is a longitudinal section view showing the antitheft device of FIG. 30.

FIG. 30 is a schematic disassembled perspective view showing an antitheft device for the battery which is used in driving the motor of the deodorizing apparatus, and FIG. 31 is a longitudinal section view showing the antitheft device of FIG. 30.

This apparatus includes a box 321 housing a battery 322 and a U-shaped rod 323 adapted to support the battery 322. The peripheral surface of the end portion of each shank of the rod is formed with a groove 324.

The U-shaped rod 323 is inserted through holes 325,326 formed on both end walls of the box 321. Thus, the rod 323 is inserted from the holes 325 at one end of the box 321 and the ends of the rod 323 which extend out from the holes 326 at the other end are fitted with ring members 327,327.

A screw 328 is threaded into the internally threaded hole 327a of the ring member 327. This screw 328 is also threaded on and off with a special screwdriver applied to a hexagonal recess which is formed at its end face and not conforming to the JIS as previously mentioned. As the screw 328 is threaded in, its end fits into the corresponding groove 324 of the rod 323 so as to preclude displacement of the U-shaped rod 323. The reference numeral 329 indicates an electrode protector for the battery 322 and the cord connected to the battery 322 extends out of a slit 330 formed at one end wall of the box 321.

Only one end portion of the U-shaped rod may be fixed with the ring member or the screw.

Passed onto the base portion of the U-shaped rod 323 is one ring 309a of the wire 308 in the same manner as described above. The other ring 309b of the wire 308 is available for undetachable connection to the water pipe 310, for instance.

In this arrangement, displacement of the U-shaped rod 323 can be prevented by the special screws 328 and, at the same time, the U-shaped rod 323 can be connected undetachably to the water pipe 310 or the like, so that theft of the battery 322 may be prevented.

In the apparatus illustrated in FIGS. 29 through 31, the hexagonal hole or recess may be substituted by a hole or recess which is otherwise configured and not defined in the industrial standards, for example a pentagonal or other polygonal hole or recess. Moreover, a chain or any other conventional connector means may be used in lieu of the wire.

The following examples and comparative examples are intended to describe the invention in further detail and should by no means be construed as limiting the scope of the invention.

EXAMPLES

Example 1

(1) Preparation of An Iodine-supporting Activated Carbon Honeycomb

An aqueous solution of $I_2O_5$ was sprayed on an activated carbon honeycomb with a BET surface area of 1,050 $m^2/g$, a number of cells of 500 cells/$inch^2$, a diameter of 50 mm and a thickness of 20 mm. Because the amount of solution that the honeycomb can contain is about 20 g of solution, the amount of the sprayed solution used was 20 g. An amount of $I_2O_5$ in the sprayed solution was calculated according to its desired amount on an obtained honeycomb. After spraying, the honeycomb was dried at 110° C. to get an iodine-supporting activated carbon honeycomb which includes 2.5 weight % of $I_2O_5$ corresponding to 1.90 wt. % of iodine.

(2) Deodorization Test

A deodorization test was performed using the gas treating apparatus illustrated in FIG. 1 (provided, however, that the acid-supporting activated carbon honeycomb was omitted). Thus, the iodine-supporting activated carbon honeycomb supporting and a sirocco fan were installed in that order in the casing and the deodorization test was carried out.

The operating time of the sirocco fan was controlled by ON-OFF of the automatic switch. Thus, on the ON mode of the automatic switch, an air containing 300 ppb of $H_2S$ and 100 ppb of $CH_3SH$ was drawn at a flow rate of 100 liters/min. Under these conditions, the sirocco fan was repeatedly operated for 10 minutes and stopped for 5 minutes.

When the cummulative operating time had reached 600 hours, the gas at the gas outlet was analyzed by gas chromatography. As a result, $H_2S$ and $CH_3SH$ were not detected, with an elimination ratio of 100%, and the discharged gas was odorless.

Example 2

(1) Preparation of An Acid-supporting Activated Carbon Honeycomb

An aqueous solution of phosphoric acid was sprayed on an activated carbon honeycomb with a BET surface area of 1,050 $m^2/g$, a number of cells of 500 cells/$inch^2$, a diameter of 50 mm and a thickness of 20 mm. Because the amount of solution that the honeycomb can contain is about 20 g of solution, the amount of the sprayed solution used was 20 g. An amount of phosphoric acid in the sprayed solution was calculated according to its desired amount on an obtained honeycomb. After spraying, the honeycomb was dried at 110° C. to get an acid-supporting activated carbon honeycomb which includes 20 weight % of phosphoric acid.

(2) Deodorization Test

A deodorizing test was performed using the apparatus illustrated in FIG. 1. Thus, the same iodine-supporting activated carbon honeycomb as Example 1 (1), the acid-supporting activated carbon honeycomb and a sirocco fan were installed in that order within the casing. The deodorization test was carried out by controlling the operation of the sirocco fan with the automatic switch in the same manner as Example 1 except that the material gas contained 300 ppb of $H_2S$, 100 ppb of $CH_3SH$ and 150 ppb of $CH_3NH_2$.

When the cummulative operating time had reached 600 hours, the gas at the gas outlet was analyzed by gas chromatography. As a result, $H_2S$, $CH_3SH$ and $CH_3NH_2$ were not detected, with an elimination rate of 100%. The discharged gas was odorless.

Examples 3 to 8 and Comparative Example 1

(1) Preparation of iodine-supporting Activated Carbon Honeycombs

An aqueous solution of 2.63 weight % KI was sprayed on an activated carbon honeycomb with a BET surface area of 1,050 $m^2/g$, a number of cells of 500 cells/$inch^2$, a diameter of 50 mm and a thickness of 20 mm. An amount of the sprayed solution was 20 g. After spraying, the honeycomb was dried at 110° C. to get an iodine-supporting activated carbon honeycomb which includes 3 weight % of KI.

The other iodine-supporting activated carbon honeycombs such as $NH_4I$-supporting, $KI\&I_2$-supporting, $KIO_3$-supporting, $NiI_2$-supporting or $CoI_2$-supporting activated carbon honeycomb were prepared by methods similar to the method mentioned above.

(2) Deodorization Test

A deodorization test was performed under the same conditions as in Example 2 except that an iodine and/or inorganic iodine-supporting activated carbon honeycomb and an acid-supporting activated carbon honeycomb were used in the combinations indicated in Table 1. The activated carbon honeycomb used for supporting iodine, inorganic iodide or acid was the same activated carbon honeycomb as used in Example 1 and the same method of supporting chemicals as Example 1 was used.

A control deodorization test was performed using the activated carbon honeycomb not supporting any iodine or inorganic iodide in combination with an activated carbon honeycomb supporting 15 weight % of phosphoric acid. The results are shown in Table 1.

Comparative Example 2

The deodorization test was conducted under the same conditions as in Example 2 except that two non-chemical-supporting activated carbon honeycombs having a BET surface area of 1,050 $m^2/g$, a number of cells of 500 cells/$inch^2$, a diameter of 50 mm and a thickness of 20 mm were used. The results are shown in Table 1.

Comparative Example 3

The deodorization test was carried out under the same conditions as in Example 2 except that two activated carbon honeycombs supporting 15 weight % of phosphoric acid, which were obtained in the same manner as in Example 2 (1), were used. The results are shown in Table 1.

upstream position within the gas passageway and an acid-supporting activated carbon honeycomb was prepared by supporting 25 weight % of $H_3PO_4$ on the same activated carbon honeycomb as above was installed in a downstream position within the gas passageway. Further disposed upstream of the inorganic iodide-supporting activated carbon honeycomb was a static charge filter (G-110, Sumitomo 3M Ltd., Japan, 74 mm $\phi$], while a sirocco fan [Topia Industries Co., Ltd., Japan] was installed downstream of the acid-supporting activated carbon honeycomb.

The operation of the fan was controlled with an infrared sensor and a timer. Thus, the timer controlling the operating time of the motor was set so that the fan would be actuated for 1.5 minutes and, then, stopped in response to an OFF signal from the sensor. The amount of gas treated during operation of the fan was 150 liters/min.

When a panel deodorization test was performed under the above conditions, all the 10 panelists reported no odor at all before, during and after defecation/urination over a period of 10 months.

Example 10

The small deodorizing apparatus illustrated in FIG. 21 was placed in the center of the bottom of a polyvinyl chloride container of 281 liters capacity (750 mm×750 mm×500 mm). This small deodorizing apparatus comprised an activated carbon honeycomb (50 mm$\phi$×20 mm, cell number 300 cells/square inch) supporting 1.0 weight % of KI disposed closer to the gas inlet of the casing, an activated carbon honeycomb (50 mm$\phi$×20 mm, cell number 300 cells/square inch) supporting 20

TABLE 1

| | Iodine/inorganic iodide | | | Acid | | Cumulative operating | |
| --- | --- | --- | --- | --- | --- | --- | --- |
| | Species | Amount supported (wt. %) | As I (wt. %) | Species | Amount supported (wt. %) | time till leakage of odor components occurs | Presence or absence of odor |
| Example 3 | $NH_4I$ | 2.5 | 2.19 | Phosphoric acid | 15 | No leaks for 600 hrs | None |
| Example 4 | KI | 3.0 | 2.29 | Oxalic acid | 15 | No leaks for 600 hrs | None |
| Example 5 | KI | 2.5 | 2.91 | Malic acid | 15 | No leaks for 600 hrs | None |
| | $I_2$ | 1.0 | | | | | |
| Example 6 | $KIO_3$ | 2.5 | 1.48 | Phosphoric acid | 15 | No leaks for 600 hrs | None |
| Example 7 | $NiI_2$ | 4.0 | 3.25 | Phosphoric acid | 15 | No leaks for 600 hrs | None |
| Example 8 | $CoI_2$ | 4.0 | 3.25 | Phosphoric acid | 15 | No leaks for 600 hrs | None |
| Comparative Example 1 | Non-supporting | | | Phosphoric acid | 15 | $CH_3SH$ begins to leak out after 200 hrs | Odor after 200 hrs |
| Comparative Example 2 | Non-supporting | | | Non-supporting | | $CH_3NH_2$ begins to leak out after 15 hrs | Odor after 15 hrs |
| Comparative Example 3 | Phosphoric acid | 15 | | Phosphoric acid | 15 | $H_2S$ and $CH_3SH$ begin to leak out after 9 hrs | Odor after 9 hrs |

Example 9

A toilet deodorizing apparatus as shown in FIG. 4 was constructed and attached to a toilet bowl as shown in FIG. 5 and a 10-month deodorization test was performed. Thus, an inorganic iodide-supporting activated carbon honeycomb prepared by supporting 2.5 weight % (2.27 wt. % as iodine) of $KI_3$ on an activated carbon honeycomb with a BET specific surface area of 925 $m^2/g$, a number of cells of 300 cells/$inch^2$, a diameter of 72 mm and a thickness of 20 mm was installed in an weight % of $H_3PO_4$ disposed closer to the gas outlet of the casing, and a fan which would operate on two dry batteries to give a flow rate of 300 liters/hr.

The above container was injected with a predetermined amount of a standard gas containing $H_2S$, $CH_3SH$ and $(CH_3)_3N$. After 1 minute of forced agitation to achieve homogenization, the gas in the center of the container was sampled through a fine-gauge Teflon ™ tube and analyzed by gas chromatography. As a result, the concentrations of the above gaseous components were found to be 1.3 ppm for $H_2S$, 0.98 ppm for $CH_3SH$ and 0.56 ppm for $(CH_3)_3N$.

In this condition, the small deodorizing apparatus was switched on. After 6 hours of operation, the gas within the container was force-agitated again for 1 minute and immediately sampled for analysis. As a result, the amounts of $H_2S$, $CH_3SH$ and $(CH_3)_3N$ were found to be invariably less than the detection limit (0.02 ppm), the gas was quite odorless and the deodorization was completed.

As a control, a commercial refrigerator deodorant containing granules of activated carbon (Kimco ®, American Drug Corporation) was placed in the center of the bottom of the same container as above and a predetermined amount of the standard gas containing $H_2S$, $CH_3SH$ and $(CH_3)_3N$ was injected into the container. The internal gas was force-agitated for 1 minute and sampled for analysis. As a result, the concentrations of the above components were found to be 1.1 ppm for $H_2S$, 0.95 ppm for $CH_3SH$ and 0.56 ppm for $(CH_3)_3N$.

The container was allowed to stand under the above conditions and after 6 hours the internal gas was force-agitated again for 1 minute and immediately sampled for analysis. As a result, the concentrations of the gaseous components were found to be 0.25 ppm for $H_2S$, 0.21 ppm for $CH_3SH$ and 0.08 ppm for $(CH_3)_3N$. The gas had a marked odor.

Example 11

An indoor deodorizing apparatus was installed in the center of a room A (internal volume 90 $m^3$) accommodating six bed-ridden elderly persons. This indoor deodorizing apparatus comprised, in a casing constituting a gas passageway extending from a gas inlet to a gas outlet, one static charge filter (G-0115, Sumitomo 3M, Ltd., Japan], 40 activated carbon honeycombs (84 mm ×44 mm×thickness 20 mm, cell number 300 cells/square inch) supporting 1.5 weight % of KI, 40 activated carbon honeycombs (84 mm×44 mm×thickness 20 mm, cell number 300 cells/square inch) supporting 15 weight of $H_3PO_4$, and a cross-flow fan as disposed in the order mentioned. As the fan was actuated, the air in the room was drawn successively through the static charge filter, KI-supporting activated carbon honeycomb, $H_3PO_4$-supporting activated carbon honeycomb and fan, and the flow rate was 5 $m^3$/minute.

There was a six-inmate room (internal volume 90 $m^3$) adjoining to room A, which was used as a reference room B. Room B was not treated with the indoor deodorizing apparatus.

The indoor deodorizing apparatus in room A was operated continuously. On day 4, a comparative organoleptic evaluation enlisting 14 panelists was performed for rooms A and B. As a result, room B was found to have marked seniority and urine odors. In contrast, room A was found to be odorless, indicating remarkably unexpected deodorizing effect of the apparatus.

Example 12

The same internal deodorizing apparatus as used in Example 11 was placed in the center of a room (internal volume 150 $m^3$) in which 49 persons took rest on a shift basis and a deodorization test for tobacco smoke was carried out. Of the 49 persons, 35 were smokers.

On day 10 of operation of the indoor deodorizing apparatus, an organoleptic evaluation involving all the 49 persons was carried out. As a result, 32 persons corresponding to 65% found that the treatment was effective.

Examples 13 to 17

The apparatus of FIGS. 22 to 23, provided with the activated carbon honeycombs, the number of cells which are shown in Table 2, dry batteries, a motor and a fan, was put in a commercial refrigerator (internal volume 112 liters) and a gas containing 3 ppm of hydrogen sulfide ($H_2S$) and 3 ppm of methylmercaptan (M.M) was introduced. Then, the residual concentrations of the respective odor components within the refrigerator were sequentially monitored by gas chromatography.

As the activated carbon honeycombs, one iodine-supporting activated carbon honeycomb prepared by supporting 1 weight % of potassium iodide (KI) on an activated carbon honeycomb with a BET specific surface area of 810 $m^2$/g, a diameter of 50 mm and a thickness of 20 mm and one acid-supporting activated carbon honeycomb prepared by supporting 10 weight % of phosphoric acid on the same activated carbon as above were employed. As another test, a gas containing 60 ppm of ammonia ($NH_3$) was injected and the residual concentration of ammonia in the refrigerator was sequentially monitored in the same manner as above. The flow rate and linear velocity of flow through said active carbon honeycombs were also measured.

Comparative Example 4

Without the apparatus used in Example 10, the residual concentrations of the various malodorous components under spontaneous attenuation were measured in the same manner as Example 10.

Comparative Example 5

A commercial refrigerator deodorant containing granular activated carbon (Kimco ®, American Drug Corporation) was used and the residual concentrations of the respective malodorous components were measured in the same manner as Example 10.

The results are set forth in Tables 2 to 5.

TABLE 2

|  | Number of cells in honeycomb (/$inch^2$) | Odor component | Elimination per pass (%) | Residue after 5 minutes (%) | Draft (liter/Hr) | Linear velocity (cm/sec.) |
| --- | --- | --- | --- | --- | --- | --- |
| Example 13 | 500 cells | $H_2S$ | 100 | 69 | 95 | 1.3 |
|  |  | M.M | 100 | 72 |  |  |
| Example 14 | 300 cells | $H_2S$ | 100 | 51 | 215 | 3.0 |
|  |  | M.M | 100 | 46 |  |  |
| Example 15 | 100 cells | $H_2S$ | 100 | 40 | 467 | 6.6 |
|  |  | M.M | 100 | 37 |  |  |
| Example 16 | 50 cells | $H_2S$ | 100 | 23 | 494 | 7.0 |
|  |  | M.M | 100 | 25 |  |  |
| Example 17 | 25 cells | $H_2S$ | 88 | 24 | 661 | 9.4 |
|  |  | M.M | 90 | 21 |  |  |
| Comparative | Spontaneous | $H_2S$ | — | 80 | — | — |

TABLE 2-continued

| | Number of cells in honeycomb (/inch²) | Odor component | Elimination per pass (%) | Residue after 5 minutes (%) | Draft (liter/Hr) | Linear velocity (cm/sec.) |
|---|---|---|---|---|---|---|
| Example 4 | attenuation | M.M | — | 83 | | |
| Comparative Example 5 | Commericial deodorant | H₂S M.M | — — | 80 83 | — — | — — |

TABLE 3

[Residue of hydrogen sulfide, %]

| | Number of cells in activated carbon honeycomb | Time (minutes) | | | | | | |
|---|---|---|---|---|---|---|---|---|
| | | 0 | 5 | 10 | 20 | 30 | 40 | 50 | 60 |
| Example 13 | 500 cells | 100 | 69 | 50 | 25 | 15 | 10 | 6 | — |
| Example 14 | 300 cells | 100 | 55 | 35 | 14 | 6 | 1 | 0 | — |
| Example 15 | 100 cells | 100 | 41 | 18 | 2 | 1 | 0 | — | — |
| Example 16 | 50 cells | 100 | 24 | 8 | 1 | 0 | — | — | — |
| Example 17 | 25 cells | 100 | 24 | 9 | 1 | 0 | — | — | — |
| Comparative Example 4 | Spontaneous attenuation | 100 | 80 | 68 | 60 | 52 | 48 | 48 | 48 |
| Comparative Example 5 | Commercial deodorant | 100 | 80 | 70 | 56 | 48 | 44 | 37 | 37 |

TABLE 4

[Residue of methylmercaptan, %]

| | Number of cells in activated carbon honeycomb | Time (minutes) | | | | | | |
|---|---|---|---|---|---|---|---|---|
| | | 0 | 5 | 10 | 20 | 30 | 40 | 50 | 60 |
| Example 13 | 500 cells | 100 | 72 | 46 | 23 | 15 | 10 | 7 | — |
| Example 14 | 300 cells | 100 | 54 | 32 | 13 | 7 | 1 | 0 | — |
| Example 15 | 100 cells | 100 | 37 | 16 | 3 | 1 | 1 | 0 | — |
| Example 16 | 50 cells | 100 | 25 | 7 | 1 | 1 | 0 | — | — |
| Example 17 | 25 cells | 100 | 22 | 8 | 1 | 0 | — | — | — |
| Comparative Example 4 | Spontaneous attenuation | 100 | 83 | 67 | 61 | 56 | 50 | 50 | 50 |
| Comparative Example 5 | Commercial deodorant | 100 | 83 | 67 | 56 | 50 | 44 | 39 | 33 |

TABLE 5

[Residue of ammonia, %]

| | Number of cells in activated carbon honeycomb | Time (minutes) | | | | | | |
|---|---|---|---|---|---|---|---|---|
| | | 0 | 5 | 10 | 20 | 30 | 40 | 50 | 60 |
| Example 13 | 500 cells | 100 | 51 | 33 | 21 | 17 | 12 | 8 | 4 |
| Example 14 | 300 cells | 100 | 47 | 27 | 14 | 8 | 3 | 1 | 0 |
| Example 15 | 100 cells | 100 | 30 | 12 | 5 | 3 | 0 | — | — |
| Example 16 | 50 cells | 100 | 26 | 8 | 3 | 1 | 0 | — | — |
| Example 17 | 25 cells | 100 | 32 | 12 | 3 | 2 | 1 | 0 | — |
| Comparative Example 4 | Spontaneous attenuation | 100 | 83 | 56 | 47 | 40 | 37 | 33 | 30 |
| Comparative Example 5 | Commercial deodorant | 100 | 68 | 50 | 45 | 37 | 33 | 30 | 27 |

It is apparent from Tables 2 to 5 that as far as the deodorizing apparatus operable on dry batteries is concerned, there exists a proper value for the number of cells within the activated carbon honeycomb and that even when using an activated carbon honeycomb with comparatively few cells, malodorous components can be efficiently eliminated in a short period of time.

What is claimed is:

1. A gas treating method which comprises treating a gas with a first activated carbon honeycomb matrix supporting alkali metal iodide.

2. A gas treating method according to claim 1 which further comprises treating the gas with at least one second activated carbon honeycomb matrix selected from the group consisting of an activated carbon honeycomb, a bromine-supporting activated carbon honeycomb matrix, a platinum group element-supporting activated carbon honeycomb matrix and an acid-supporting activated carbon honeycomb matrix.

3. A gas treating method according to claim 2 which comprises treating the gas with the first activated carbon honeycomb matrix supporting an alkali metal iodide, in an amount of from 0.1 to 40 weight %, in terms of elemental iodine, relative to the first activated carbon honeycomb matrix and with the second activated carbon honeycomb matrix supporting from 10 to 30 weight % of bromine relative to the second activated honeycomb matrix.

4. A gas treating method according to claim 2 which comprises treating the gas with the first activated carbon honeycomb matrix supporting an alkali metal iodide, in an amount of from 0.1 to 40 weight %, in terms of elemental iodine, relative to the first activated carbon honeycomb matrix and with the second activated carbon honeycomb matrix supporting from 0.1 to 20 weight % of at least one platinum group element, relative to the second activated honeycomb.

5. A gas treating method according to claim 2 wherein the at least one second activated carbon honeycomb matrix is an acid-supporting activated carbon honeycomb matrix.

6. A gas treating method according to claim 5 wherein said acid-supporting activated carbon honeycomb matrix supports a phosphoric acid.

7. A gas treating method according to claim 5 wherein an acid is supported by said acid-supporting activated carbon honeycomb matrix in a proportion of from 1 to 60 weight % relative to the acid-supporting activated carbon honeycomb matrix.

8. A gas treating method according to claim 2 which comprises treating the gas with the first activated carbon honeycomb matrix supporting an alkali metal iodide, in an amount of from 0.1 to 40 weight %, in terms of elemental iodine, relative to the first activated carbon honeycomb matrix and with the second activated carbon honeycomb supporting a phosphoric acid in an amount of from 1 to 60 weight % of phosphoric acid relative to the second activated carbon honeycomb matrix.

9. A gas treating method according to claim 2 which comprises treating the gas with the first activated carbon honeycomb matrix supporting said alkali metal iodide in an amount of from 0.4 to 10 weight %, in terms of elemental iodine, relative to the first activated carbon honeycomb matrix and with the second activated carbon honeycomb matrix supporting from 5 to 40 weight % of phosphoric acid relative to the second activated carbon honeycomb matrix in that order, each of the honeycomb matrices having a BET specific surface area of not less than 400 m2/g, a number of cells of from 20 to 1,000 cells/square inch and a thickness of from 7.5 to 1,000 mm, at a linear velocity of from 1 to 200 cm/second and a space velocity of 20 to 500,000 hr$^1$.

10. A gas treating method according to claim 2, for maintaining freshness of a plant or fruit in a closed space, which comprises treating the gas in said space with the first activated carbon honeycomb matrix supporting an alkali metal iodide in an amount of from 0.1 to 40 weight %, in terms of elemental iodine, relative to the first activated carbon honeycomb matrix and with either the second activated carbon honeycomb matrix supporting from 1 to 30 weight % of bromine relative to the second activated carbon honeycomb matrix or the second activated carbon honeycomb matrix supporting from 0.1 to 20 weight % of a platinum group element relative to the second activated carbon honeycomb matrix.

11. A gas treating method according to claim 1 which comprises treating the gas within a toilet, refrigerator or car with the alkali metal iodide-supporting first activated carbon honeycomb matrix.

12. An activated carbon honeycomb matrix for deodorization supporting an alkali metal iodide.

13. An activated carbon honeycomb matrix according to claim 12 wherein the amount of alkali iodide relative to the activated carbon honeycomb matrix is from 0.1 to 40 weight % in terms of first iodine.

14. An activated carbon honeycomb matrix according to claim 12 wherein an alkali metal iodide is present in an amount of from 0.1 to 40 weight %, in terms of elemental iodine, relative to the activated carbon honeycomb matrix and wherein the activated carbon honeycomb matrix has a BET specific surface area of not less than 200 m$^2$/g, a number of cells of from 10 to 1,500 cells/square inch and a thickness of not less than 5 mm.

15. A gas treating apparatus comprising an alkali metal iodide-supporting first activated carbon honeycomb matrix located in a gas passageway extending from a gas inlet means to a gas outlet means.

16. A gas treating apparatus according to claim 15 which further comprises at least one second activated carbon honeycomb matrix selected from the group consisting of an activated carbon honeycomb matrix, a bromine-supporting activated carbon honeycomb matrix, a platinum group element-supporting activated carbon honeycomb matrix and an acid-supporting activated carbon honeycomb located in said gas passageway.

17. A gas treating apparatus according to claim 16, for use in association with a toilet, which further comprises a gas duct having a suction port to be disposed within a toilet bowl, a fan means and an exhaust port to be disposed outside the toilet bowl, wherein the alkali metal iodide-supporting first activated carbon honeycomb matrix and the fan means are disposed, in that order, in said gas duct in a direction defined from said suction port to said exhaust port.

18. A gas treating apparatus according to claim 17 wherein the alkali metal iodide-supporting first activated carbon honeycomb matrix, the at least one second activated carbon honeycomb matrix selected from the group consisting of an activated carbon honeycomb matrix, a bromine supporting activated carbon honeycomb matrix, a platinum group element-supporting activated carbon honeycomb matrix and an acid-supporting activated carbon honeycomb matrix, and the fan means are disposed in that order, in said gas duct in a direction defined from said suction port to said exhaust port.

19. A gas treating apparatus according to claim 17 further comprising a sensor means for detecting a user's sitting on a toilet seat and leaving the seat, a driving means for driving said fan means in response to a sitting detection signal from said sensor means, and a control means for controlling the operating time of said driving means in response to a leaving detection signal from said sensor means.

20. A gas treating apparatus according to claim 17 which apparatus comprises an alkali metal iodide-supporting first activated carbon honeycomb matrix and an acid-supporting second activated carbon honeycomb disposed in that order, in said gas duct in a direction defined from said suction port to said exhaust port, each of the activated carbon honeycomb matrices having a BET specific surface area of not less than 200 m$^2$/g, a number of cells of from 20 to 1,000 cells/square inch and a thickness of not less than 5 mm, a fan disposed downstream of said acid-supporting second activated carbon honeycomb matrix located in said gas duct, a photosensing means set obliquely upwards from the exterior side of said toilet to the interior side of said toilet for detecting a user's sitting on a toilet seat and leaving the seat, a driving means for driving said fan in response to a sitting detection signal from said photosensing means, and a timer means for actuating said driving means for at least 10 seconds in response to a leaving detection signal from said photosensing means.

21. A gas treating apparatus according to claim 20 wherein the alkali metal iodide-supporting first activated carbon honeycomb matrix supports an alkali metal iodide in an amount of from 0.4 to 10 weight %, in terms of elemental iodine, relative to the first activated carbon honeycomb matrix and wherein the acid-supporting second activated carbon honeycomb matrix supports a phosphoric acid in an amount of from 5 to 40 weight % relative to the acid-supporting second activated carbon honeycomb matrix.

22. A gas treating apparatus according to claim 15 which further comprises at least one second activated carbon honeycomb matrix selected from the group consisting of an activated carbon honeycomb matrix, a bromine-supporting activated carbon honeycomb matrix, a platinum group element-supporting activated carbon honeycomb matrix and an acid-supporting activated carbon honeycomb matrix, and a fan means located in said gas passageway.

23. A gas treating apparatus according to claim 15 which further comprises a static charge filter disposed upstream of the alkali metal iodide-supporting first activated carbon honeycomb matrix located in said gas passageway.

24. A gas treating apparatus according to claim 15 wherein said gas passageway is defined by a casing extending from said gas inlet means to said gas outlet means, further comprising a fan means for ventilating a gas in a direction defined from said gas inlet means to said gas outlet means and a battery for said fan means located in said casing, wherein said gas inlet and outlet means are disposed in differently oriented parts of said casing.

25. A gas treating apparatus according to claim 24 wherein said first activated carbon honeycomb matrix and said battery can be replaceably installed within said gas passageway.

26. A gas treating apparatus according to claim 24 wherein said gas inlet and outlet means are disposed on the same surface or adjoining surfaces of said casing.

27. A gas treating apparatus according to claim 24 wherein said first activated carbon honeycomb matrix has a number of cells of from 10 to 500 cells/square inch.

28. A gas treating apparatus according to claim 24 wherein the alkali metal iodide-supporting first activated carbon honeycomb matrix supports the alkali metal iodide in an amount of from 0.4 to 10 weight %, in terms of elemental iodine, relative to the alkali metal iodide-supporting first activated carbon honeycomb matrix, and further comprising an acid-supporting second activated carbon honeycomb matrix supporting from 5 to 40 weight % of phosphoric acid relative to the acid-supporting second activated carbon honeycomb.

29. A gas treating apparatus according to claim 15, for use in association with a dust bin, which further comprises a box with an opening for accommodating garbage, a lid member for covering the opening of said box, wherein gas inlet means communicates with said box.

30. A gas treating apparatus according to claim 15, for use in association with the interior of a refrigerator or car, wherein said gas inlet means communicates with the interior of the refrigerator or car.

31. A gas treating apparatus according to claim 15 wherein the alkali metal iodide-supporting activated carbon honeycomb supports the alkali metal iodide in an amount of from 0.4 to 10 weight %, in terms of iodine, relative to the alkali metal iodide-supporting activated carbon honeycomb matrix, and further comprising an acid-supporting activated carbon honeycomb matrix supporting from 5 to 40 weight % of phosphoric acid relative to the acid-supporting activated carbon honeycomb.

32. A gas treating apparatus according to claim 15 which further comprises a static charge filter for trapping particles disposed upstream of the alkali metal iodide-supporting activated carbon honeycomb matrix located in said gas passageway.

* * * * *